(12) United States Patent
Wallenberger

(10) Patent No.: US 6,818,575 B2
(45) Date of Patent: Nov. 16, 2004

(54) GLASS FIBER FORMING COMPOSITIONS

(75) Inventor: Frederick T Wallenberger, Pittsburgh, PA (US)

(73) Assignee: PPG Industries Ohio, Inc., Cleveland, OH (US)

(*) Notice: Subject to any disclaimer, the term of this patent is extended or adjusted under 35 U.S.C. 154(b) by 0 days.

(21) Appl. No.: 10/363,609

(22) PCT Filed: Sep. 5, 2001

(86) PCT No.: PCT/US01/27451

§ 371 (c)(1),
(2), (4) Date: Mar. 4, 2003

(87) PCT Pub. No.: WO02/20419

PCT Pub. Date: Mar. 14, 2002

(65) Prior Publication Data

US 2003/0224922 A1 Dec. 4, 2003

Related U.S. Application Data

(60) Provisional application No. 60/230,474, filed on Sep. 6, 2000.

(51) Int. Cl.[7] .......................... C03C 3/087; C03C 13/06
(52) U.S. Cl. .............................. 501/35; 501/36; 501/70
(58) Field of Search ............................. 501/35, 36, 70

(56) References Cited

U.S. PATENT DOCUMENTS

| 3,600,205 A | 8/1971 | Breton ........................ 106/50 |
| 3,847,626 A | 11/1974 | Erickson ..................... 106/50 |
| 3,847,627 A | 11/1974 | Harsch | |
| 3,876,481 A | 4/1975 | Erickson et al. ............. 106/50 |
| 3,929,497 A | 12/1975 | Clark-Monks ............... 106/50 |
| 4,026,715 A | 5/1977 | Erickson et al. ............. 106/50 |
| 4,066,466 A | 1/1978 | Neely, Jr. .................... 106/50 |
| 4,166,747 A | 9/1979 | Neely, Jr. .................... 106/50 |
| 4,199,364 A | 4/1980 | Neely ......................... 106/50 |
| 4,542,106 A | 9/1985 | Sproull ....................... 501/38 |
| 4,628,038 A | 12/1986 | Weirauch, Jr. ............... 501/35 |
| 4,882,302 A | 11/1989 | Horiuchi et al. ............. 501/27 |
| 5,789,329 A | 8/1998 | Eastes et al. ................ 501/36 |
| 5,843,854 A | 12/1998 | Karppinen et al. .......... 501/36 |
| 5,962,354 A | 10/1999 | Fyles et al. ................. 501/36 |
| 6,136,735 A | 10/2000 | Gallo et al. ................. 501/36 |
| 6,686,304 B1 | 2/2004 | Wallenberger .............. 501/35 |

FOREIGN PATENT DOCUMENTS

| FR | 2692248 | 6/1992 |
| FR | 2768144 | 9/1997 |
| GB | 520247 | 4/1940 |
| GB | 1391384 | 4/1975 |
| JP | 10-203845 | 8/1998 |
| JP | 10-231142 | 9/1998 |
| JP | 10-231143 | 9/1998 |
| RU | 2027687 | 1/1995 |
| WO | WO96/39362 | 12/1996 |
| WO | 96/39362 | * 12/1996 |
| WO | 98/01932 | * 2/1999 |
| WO | WO99/12858 | 3/1999 |
| WO | WO 00/73231 | 12/2000 |

OTHER PUBLICATIONS

*The Manufacturing Technology of Continuous Glass Fibres*, by Loewenstein (3rd Ed 1993) pp. 30–44, 47–60, 85–107, 115–122, 126–135.

*Advanced Inorganic Fibers: Processes, Structures, Properties, Applications*, by Wallenberger et al. (2000); pp. 81–102; 129–168.

* cited by examiner

*Primary Examiner*—Karl Group
(74) *Attorney, Agent, or Firm*—Andrew C. Siminerio; Dennis G. Millman

(57) ABSTRACT

A glass fiber composition has 52 to 62 percent by weight $SiO_2$, 0 to 2 percent by weight $NaO_2O$, 16 to 25 percent by weight CaO, 8 to 16 percent by weight $Al_2O_3$, 0.05 to 0.80 percent by weight $Fe_2O_3$, 0 to 2 percent by weight $K_2$, 1 to 5 percent by weight MgO, 0 to 5 percent by weight $B_2O_3$, to 0 to 2 percent by weight $TiO_2$, and 0 to 1 percent by weight F, and further has a log 3 forming temperature of no greater than 1240° C. based on an NIST 714 reference standard, a ΔT of at least 50° C., and a $SiO_2/RO$ ratio of no greater than 2.35.

10 Claims, 6 Drawing Sheets

GLASS FIBER FORMING COMPOSITIONS

CROSS REFERENCE TO RELATED PATENT APPLICATIONS

Figure 1:
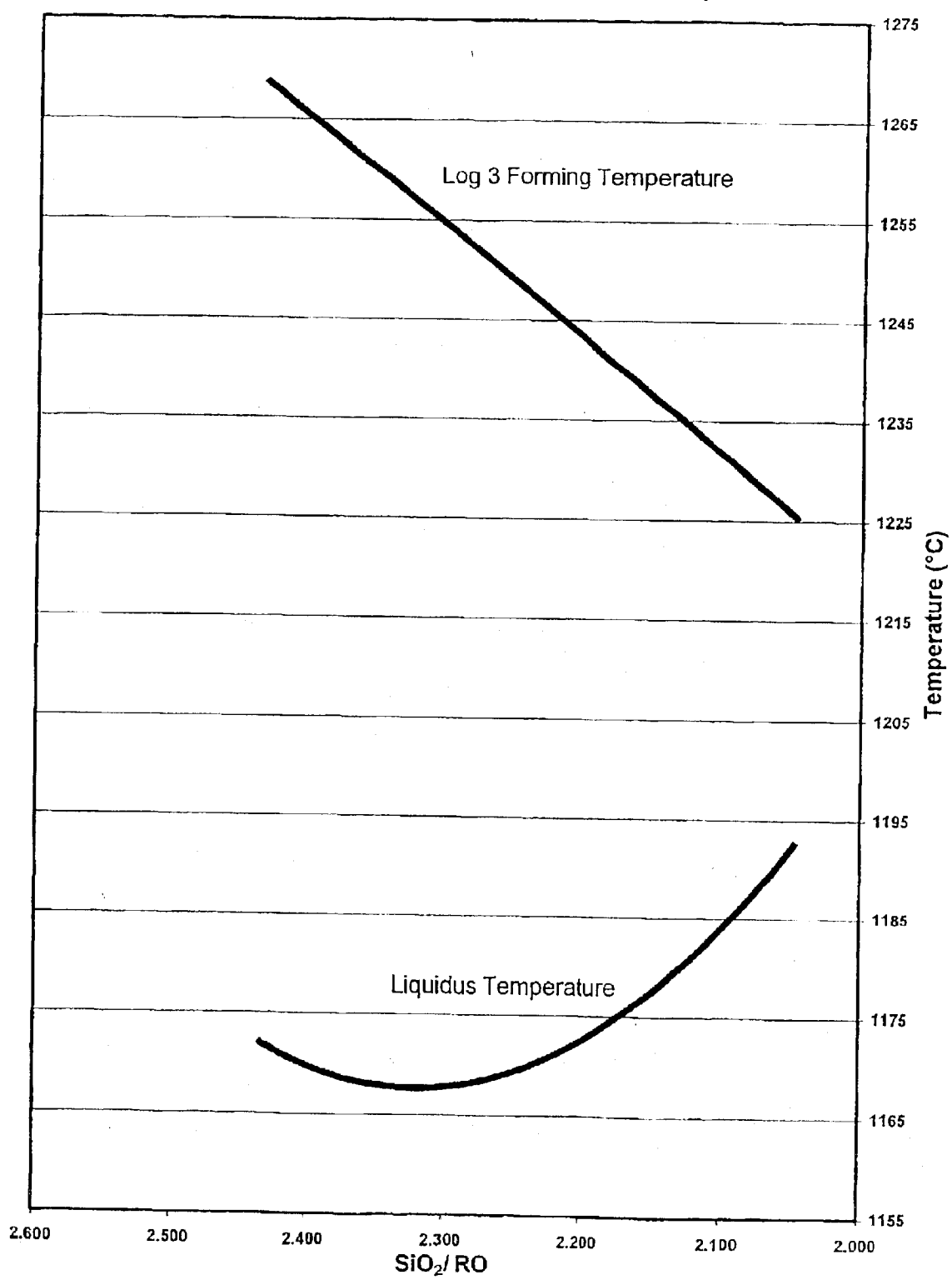

This application claims the benefit of U.S. Provisional Application No. 60/230,474, filed Sep. 6, 2000.

The present invention relates to glass compositions for making glass fibers, and more particular to glass compositions having lowered liquidus and forming temperatures.

The most common glass composition for making continuous glass fiber strands for textiles and glass fiber reinforcements is "E" glass. The requirements as to what type of composition constitutes an E-glass composition are included in ASTM D578-98. An advantage of using E-glass is that its liquidus temperature is well below its forming temperature, i.e. typically greater than 56° C. (100° F.) and generally between 83 to 111° C. (150 to 200° F.). As used herein, the terms "forming temperature", "$T_{FORM}$" and "log 3 forming temperature" mean the temperature of the glass at which the viscosity of the glass is log 3, or 1000 poise, and the terms "liquidus temperature" and "$T_{LIQ}$" mean the temperature at which solid phase (crystals) and liquid phase (melt) are in equilibrium. The difference between $T_{FORM}$ and $T_{LIQ}$, referred to herein as "delta T" or "$\Delta T$", is a common measure of the crystallization potential of a given melt composition. In the glass fiber forming industry, $\Delta T$ is typically maintained at a temperature of at least 50° C. (90° F.) in order to prevent devitrification of the molten glass during a glass fiber forming operation, and in particular in the bushing area.

Boron and fluorine containing glass were developed to meet these operating conditions. More specifically, the boron and fluorine were included in the glass batch materials to act as fluxes during the glass melting operation. In particular, E-glass can include up to 10 wt % $B_2O_3$ and up to 1.0 fluoride (see ASTM D 578-00 §4.2). However, these materials are volatilized during melting and boron and fluorine emissions are released to the atmosphere. Since boron and fluorine are considered pollutants, these emissions are closely controlled by environmental regulations, which in turn requires careful control of the furnace operations and the use of expensive pollution control equipment. In response to this, low boron and/or low fluorine E-glasses were developed. As used herein, "low boron" means that the glass composition is no greater than 5 weight percent (wt %) boron, and includes boron-free glass, and "low fluorine" means that the glass composition is no greater than 0.30 wt % fluorine, and includes fluorine-free glass.

For additional information concerning glass compositions and methods for fiberizing the glass composition, see K. Loewenstein, *The Manufacturing Technology of Continuous Glass Fibres*, (3d Ed. 1993) at pages 30–44, 47–60, 115–122 and 126–135, and F. T. Wallenberger (editor), *Advanced Inorganic Fibers: Processes, Structures, Properties, Applications*, (2000) at pages 81–102 and 129–168, which are hereby incorporated by reference.

Because the actual glass fiber forming operation is conducted at high temperatures, there is high energy usage associated with its production, along with associated high energy costs. In addition, the high temperatures accelerate the degradation of the refractory used in the glass melting furnace, as well as the bushings used to form the fibers. The bushings include precious metals that cannot be recovered from the glass as the bushings corrode. It would be advantageous to produce the glass fibers at the lowest possible forming and liquidus temperatures so as to reduce the energy usage and costs and thermal load on the furnace refractory and bushings, while at the same time provide the $\Delta T$ required to ensure an uninterrupted glass fiber forming operation. Reducing the forming and liquidus temperatures of the glass compositions can also result in environmental benefits, such as but not limited to, a reduction in the amount of fuel required to generate the energy necessary for the fiber forming operation, as well as a reduction in the flue gas temperature. In addition, it would be advantageous if the glass compositions are low fluorine and/or low boron compositions so as to reduce or eliminate the environmental pollutants associated with these materials.

The present invention provides a low boron content glass fiber forming composition that has a forming temperature of no greater than 1240° C. (2262° F.), a $\Delta T$ of at least 50° C. (90° F.), and a ratio of $SiO_2$ to RO (i.e. CaO+MgO) of no greater than 2.35. In one nonlimiting embodiment of the present invention, the glass composition has a silica content of no greater than 59 weight percent. In another nonlimiting embodiment of the invention, the glass composition is boron-free.

Figure 2:
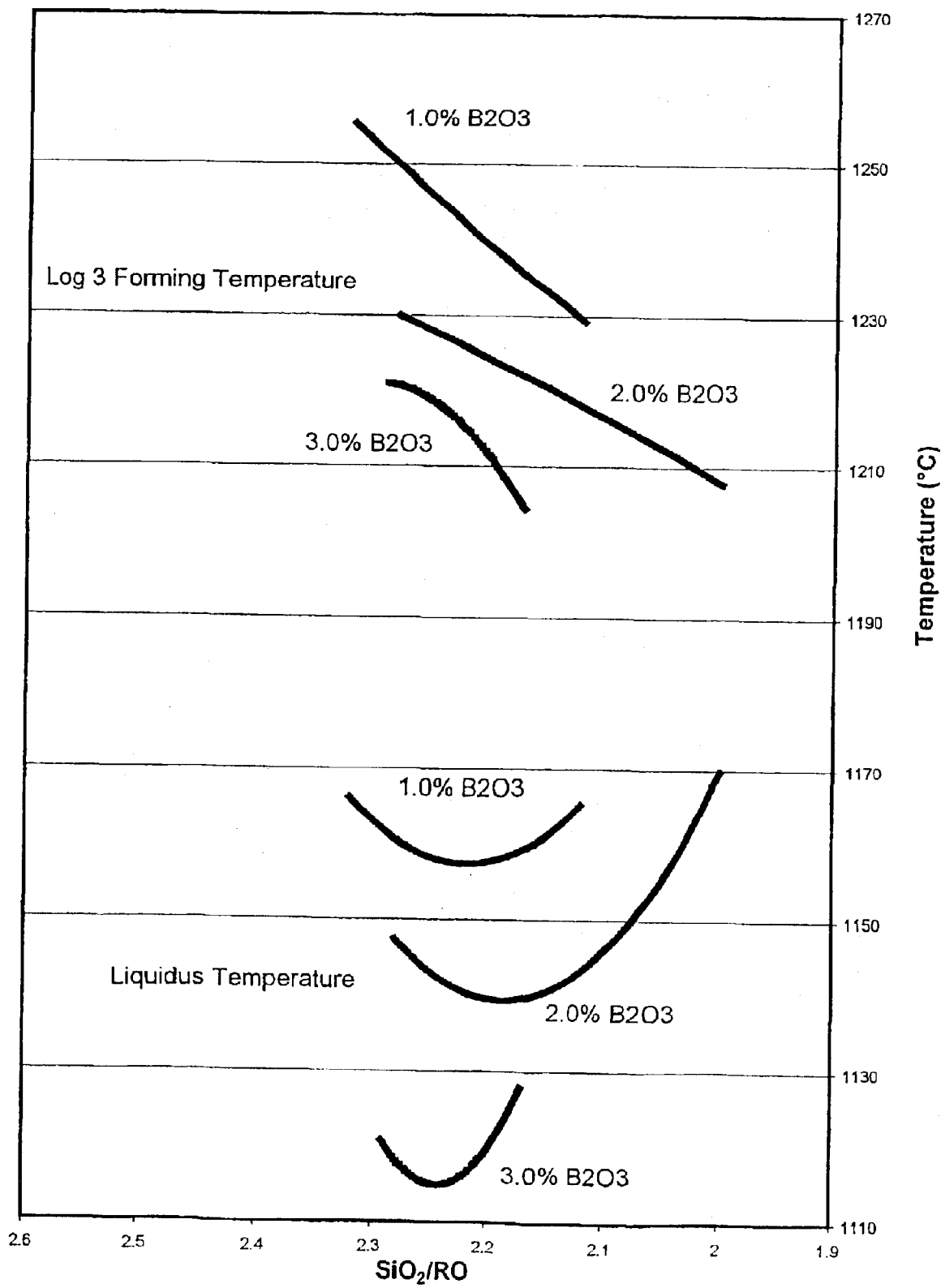
Figure 3:
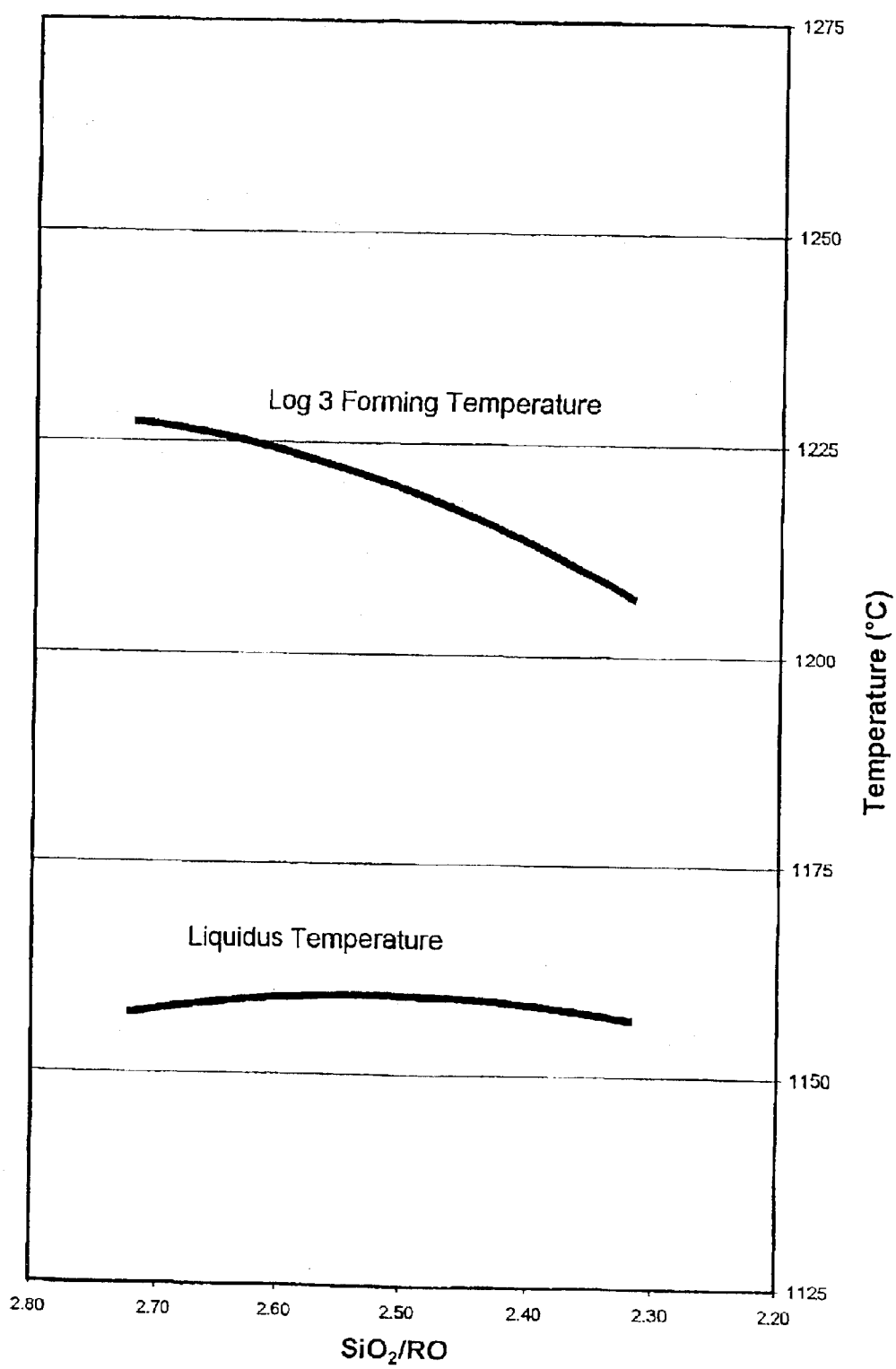
Figure 4:
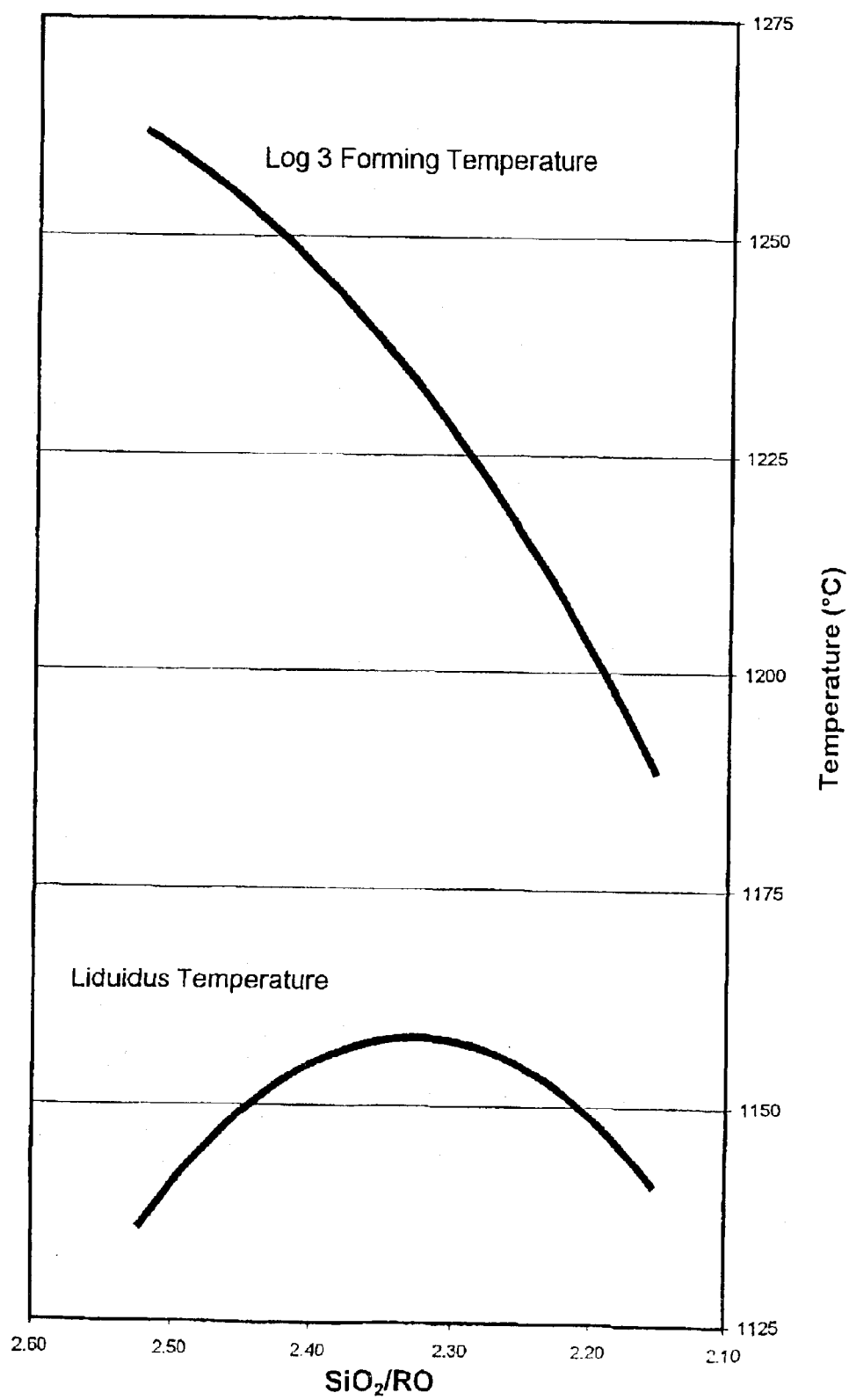
Figure 5:
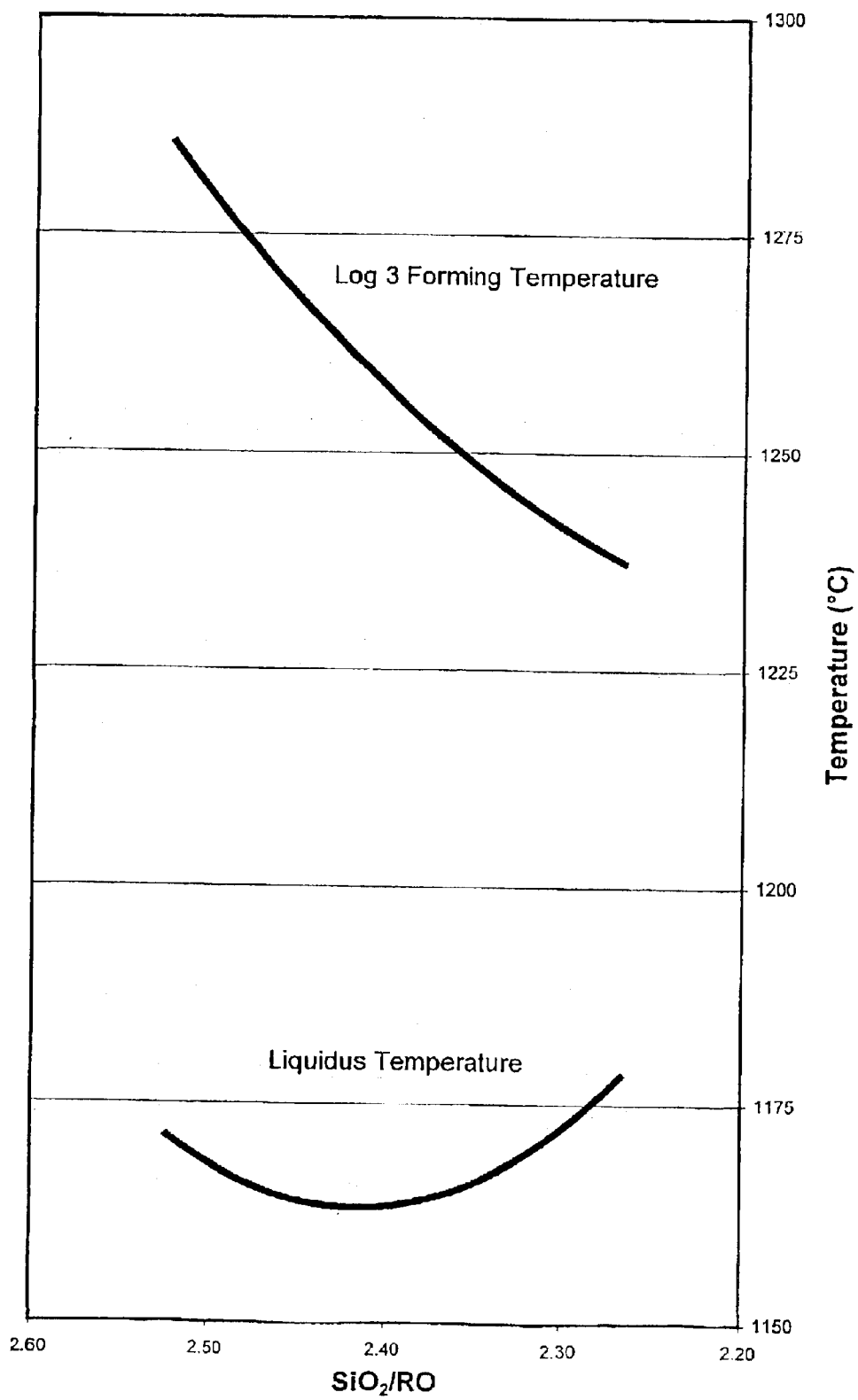
Figure 6:
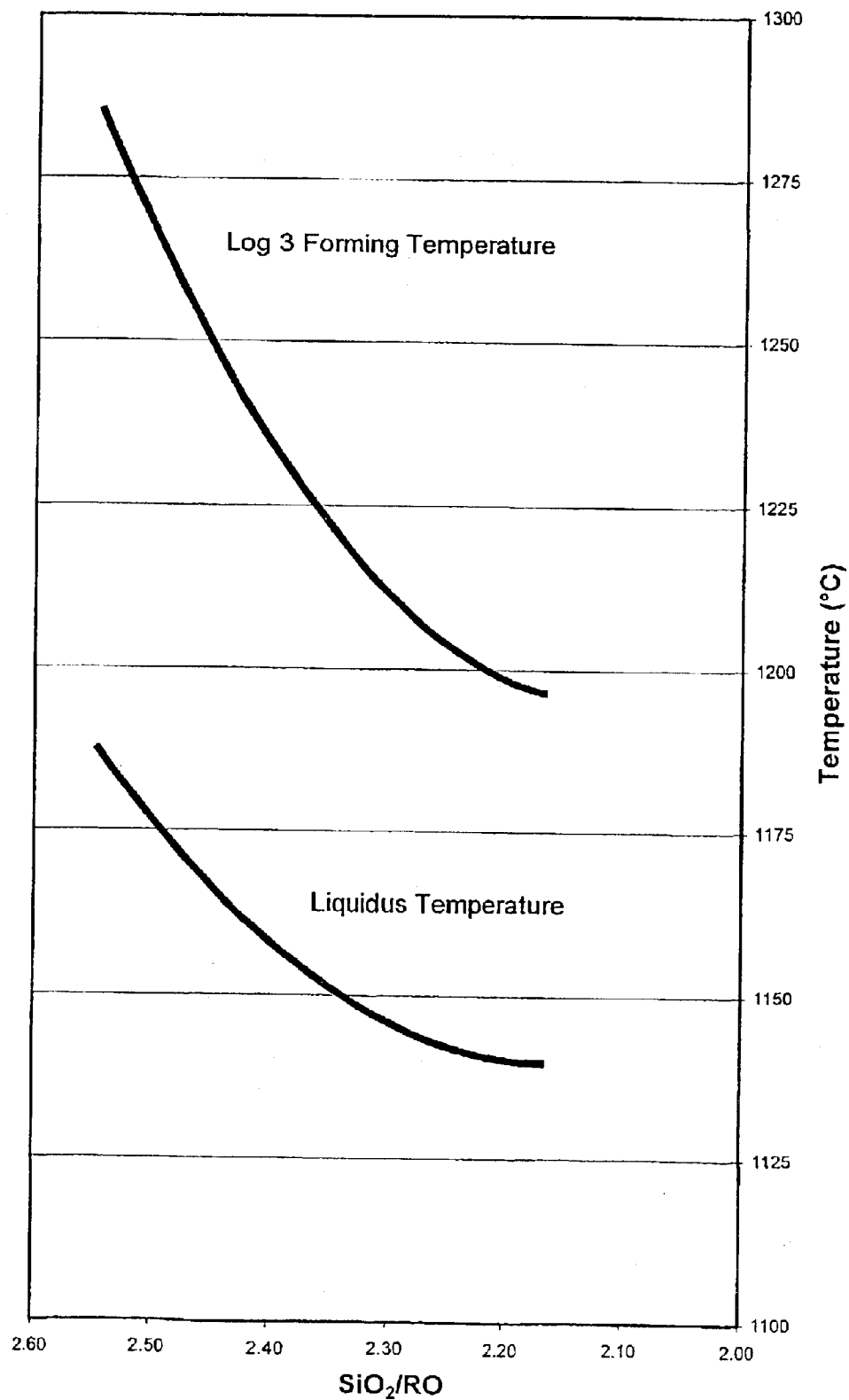

The foregoing summary, as well as the following detailed description of embodiments of the present invention, will be better understood when read in conjunction with the appended drawings. In the drawings:

FIGS. 1–6 are curves showing the relationship between the ratio of $SiO_2$ to RO of various glass fiber forming compositions to the compositions' forming and liquidus temperatures based on the data shown in corresponding Tables A through F, respectively.

The base composition for the low boron glass fibers of the present invention suitable for textiles and glass fiber reinforcements includes the following main constituents in weight percent based on the total weight of the final glass composition.

|  | broad range | alternate range |
|---|---|---|
| $SiO_2$ (wt %) | 52 to 62 | 53 to 59 |
| $Na_2O$ (wt %) | 0 to 2 | up to 1.5 |
| CaO (wt %) | 16 to 25 | 20 to 25 |
| $Al_2O_3$ (wt %) | 8 to 16 | 11 to 14 |
| $Fe_2O_3$ (wt %) | 0.05 to 0.80 | up to 0.5 |
| $K_2O$ (wt %) | 0 to 2 | up to 1 |

It should be appreciated that, unless otherwise indicated, all numerical values discussed herein, such as but not limited to weight percent of materials or temperatures, are approximate and are subject to variations due to various factors well known to those skilled in the art such as, but not limited to, measurement standards, equipment and techniques. As a result, such values are to be understood as being modified in all instances by the term "about". Accordingly, unless indicated to the contrary, the numerical parameters set forth in the following specification and attached claims are approximations that may vary depending upon the desired properties sought to be obtained by the present invention. At the very least each numerical parameter should at least be construed in light of the number of reported significant digits and by applying ordinary rounding techniques. For example, where it states in the present application that the range for $SiO_2$ is 52 to 62 weight percent, this range is about 52 to about 62 weight percent, and where it states that the forming temperature of a glass composition should be no greater than 1249° C. (2280° F.), the temperature is about 1249° C.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements.

In addition, where the amount of a particular material or combinations of materials disclosed herein is expressed in terms of "percent" or "%", it should be understood that this means "weight percent" or "wt %".

Additional materials can be added to the glass composition to modify the melt properties of the glass. For example, and without limiting the glass compositions disclosed herein, $Li_2O$, $ZnO$, $MnO$ and/or $MnO_2$, can be added to the glass fiber composition to reduce $T_{FORM}$ and/or $T_{LIQ}$. In one non-limiting embodiment of the present invention, the glass composition includes 0 to 1.5 wt % $Li_2O$ and/or 0 to 1.5 wt % $ZnO$ and/or 0 to 3 wt % $MnO$ and/or 0 to 3 wt % $MnO_2$. It is believed that levels of these materials less than 0.05 wt % would be considered either tramp amounts or so low that they will not materially impact the glass melt properties. As a result, in another non-limiting embodiment, 0.05 to 1.5 wt % $Li_2O$ and/or 0.05 to 1.5 wt % $ZnO$ and/or 0.05 to 3 wt % $MnO$ and/or 0.05 to 3 wt % $MnO_2$ are included in the glass composition. In still another nonlimiting embodiment of the invention, the glass compositions include 0.2 to 1 wt % $Li_2O$ and/or 0.2 to 1 wt % $ZnO$ and/or up to 1 wt % $MnO$ and/or up to 1 wt % $MnO_2$.

MgO is another material typically included in a glass fiber forming composition. It has been found that the heating and melting profile of a glass fiber composition, and in particular the liquidus temperature, can be controlled and in particular optimized by controlling the amount of MgO. In addition, it has been determined that a eutectic (minimum liquidus temperature) exists in a generic quaternary $SiO_2$—$Al_2O_3$—$CaO$—$MgO$ at around 2.5 wt % MgO (see PCT Application No. US 00/14155, which is incorporated herein by reference). Without limiting the present invention, in one nonlimiting embodiment, the glass fiber composition includes 1 to 5 wt % MgO, e.g. 1 to 4 wt % or 1.7 to 2.9 wt % or 1.9 to 2.65 wt % MgO.

Boron is another material that can be added to glass fiber compositions to reduce $T_{FORM}$ and $T_{LIQ}$. However, as discussed earlier, the inclusion of boron results in the production of particulate emissions that, depending on the particulate level, may have to be removed from a melting furnace exhaust stream before being released into the environment. Although the amount of $B_2O_3$ in a glass fiber composition can be as high as 10 wt %, in the present invention, the glass composition has a low boron content, i.e. has a $B_2O_3$ content of no greater than 5 wt %. In other nonlimiting embodiments of the present invention, the glass fiber composition has no greater than 4 wt %, or no greater than 3 wt %, or no greater than 2 wt % $B_2O_3$. In another nonlimiting embodiment of a glass fiber forming composition, the low boron content glass composition is essentially boron-free, i.e. it includes no more than a trace amount of $B_2O_3$, which is considered herein to be up to 0.05 wt % $B_2O_3$. In still another nonlimiting embodiment, the low boron content glass fiber composition does not include any $B_2O_3$.

It should be appreciated that glass fiber compositions can include other constituents and the present invention contemplates the inclusion of other materials in the glass fiber compositions, such as, but not limited to, 0 to 2 wt % each of $TiO_2$, $BaO$, $ZrO_2$ and $SrO$, e.g. up to 1.5 wt % or up to 1 wt % of each of these materials.

In addition, because of the environmental concerns discussed earlier, in one nonlimiting embodiment of the present invention, the glass composition has a low fluorine content. In another nonlimiting embodiment, the glass composition is fluorine-free, i.e. it includes no more than a trace amount of fluorine, which is considered herein to be up to 0.05 wt % fluorine. In still another nonlimiting embodiment, the glass composition does not include any fluorine. Except where otherwise indicated, the glass fiber forming compositions disclosed and discussed herein are fluorine-free.

It should be appreciated that the glass compositions disclosed herein can also include small amounts of other materials, for example melting and refining aids, tramp materials or impurities. For example and without limiting the present invention, melting and fining aids, such as $SO_3$, are useful during production of the glass, but their residual amounts in the glass can vary and have minimal, if any, material effect on the properties of the glass product. In addition, small amounts of the additives discussed above can enter the glass composition as tramp materials or impurities included in the raw materials of the main constituents.

Commercial glass fibers of the present invention can be prepared in the conventional manner well known in the art, by blending the raw materials used to supply the specific oxides that form the composition of the fibers. For example, typically sand is used for $SiO_2$, clay for $Al_2O_3$, lime or limestone for CaO, and dolomite for MgO and some of the CaO. As discussed earlier, the glass can include other additives that are added to modify the glass properties as well as small amounts of melting and refining aids, tramp materials or impurities.

After the ingredients are mixed in the proper proportions to provide the desired weight of each constituent for the desired glass, the batch is melted in a conventional glass fiber melting furnace and the resulting molten glass is passed along a conventional forehearth and into a glass fiber forming bushing located along the bottom of the forehearth, as is well known to those skilled in the art. During the glass melting phase, the glass batch materials are typically heated to a temperature of at least 1400° C. (2550° F.). The molten glass is then drawn or pulled through a plurality of holes in the bottom of the bushing. The streams of molten glass are attenuated to form filaments by gathering a plurality of filaments together to form a strand and winding the strand on a forming tube mounted on a rotatable collet of a winding machine. Alternatively, the fiber forming apparatus can be, for example, a forming device for synthetic textile fibers or strands in which fibers are drawn from nozzles, for example a spinneret, wherein fibers are drawn through holes in a plate, as is known to those skilled in the art. Typical forehearths and glass fiber forming arrangements are shown in K. Loewenstein, *The Manufacturing Technology of Continuous Glass Fibres*, (Third Edition 1993) at pages 85–107 and pages 115–135, which are hereby incorporated by reference.

Several series of different types of low boron glass fiber compositions were made to examine certain relationships between the amount of selected glass constituents and the corresponding forming and liquidus temperatures in order to identify glass compositions having a lowered forming temperature and a desired ΔT. During testing, the glass compositions for the different series of experimental samples were divided into the following main compositional categories and subcategories:

Type I-high $T_{Form}$ ($T_{form}$>1240° C.), low boron content
  Type I-1 boron-free
  Type I-2 up to 2.5 wt % $B_2O_3$
Type II-low $T_{form}$ ($T_{form}$≦1240° C.) low boron content, 2.5 wt % MgO
  Type II-1 boron-free
  Type II-2 up to 5 wt % $B_2O_3$
Type III-low $T_{form}$ ($T_{form}$≦1240° C.) low boron content, 2.5 wt % MgO lithium and/or zinc
  Type III-1 boron-free with lithium
  Type III-2 boron-free with lithium and zinc
  Type III-3 boron-free with zinc
  Type III-4 up to 5% wt % $B_2O_3$ with lithium Type I-1 glasses would include prior art glasses such as those disclosed in Example 1 of French Patent 2,768,144 (hereafter "Patent '144") U.S. Pat. Nos. 4,542,106 and 5,789,329 (hereafter "Patent '106" and "Patent '329", respectively), and ADVANTEX® glass, which is commercially available from Owens Corning Fiberglass, and typically include approximately 60 wt % $SiO_2$, 25 wt % CaO+MgO (hereinafter "RO"), and 12–14 wt % $Al_2O_3$ and are boron-free. Type I-2 glasses would include prior art glasses such as that disclaosed in Example 2 Patent '144, which includes 1.8 wt % $B_2O_3$ and 60.82 wt % $SiO_2$.

tables A through F include examples of each series of glass fiber compositions and were used to generate corresponding FIGS. 1–6, respectively, as will be discussed late in more detail. In Table A, Examples 1–8 are Type II-1 glasses while Examples 9–34 are Type I-1 glasses In Table B, Examples 35–77 are Type II-2 glasses while Examples 78–83 are Type I-2 glasses. In Table C, Examples 84–143 and 152–156 are Type III-1 glasses while Examples 144–151 are similar but have a log 3 forming temperature greater than 1240° C. In Table D, Examples 157–171 are Type III-2 glasses while Examples 172–183 are Type III-3 glasses while Examples 184–193 are similar but have a log 3 forming temperature greater than 1240° C. In Table F, Examples 198–296 are Type III-4 glasses while Examples 297 and 298 are similar but have a log 3 forming temperature greater than 1240° C.

TABLE A

TYPE I-1 AND II-1 GLASS

| Composition Weight % | Examples | | | | | | | | | |
|---|---|---|---|---|---|---|---|---|---|---|
| | 1 | 2 | 3 | 4 | 5 | 6 | 7 | 8 | 9 | 10 |
| SiO2 | 57.95 | 57.75 | 58.05 | 57.65 | 57.45 | 58.72 | 57.72 | 59.05 | 60.13 | 60.63 |
| Al2O3 | 13.20 | 13.20 | 13.40 | 13.40 | 13.40 | 11.65 | 11.64 | 12.20 | 12.27 | 12.27 |
| CaO | 24.05 | 24.25 | 23.75 | 24.15 | 24.35 | 24.58 | 25.58 | 23.95 | 22.92 | 22.42 |
| MgO | 2.55 | 2.55 | 2.55 | 2.55 | 2.55 | 2.61 | 2.61 | 2.55 | 2.50 | 2.50 |
| TiO2 | 1.10 | 1.10 | 1.10 | 1.10 | 1.10 | 1.12 | 1.12 | 1.10 | 1.00 | 1.00 |
| Na2O | 0.90 | 0.90 | 0.90 | 0.90 | 0.90 | 0.92 | 0.92 | 0.90 | | 0.98 |
| K2O | | | | | | 0.05 | 0.05 | | | |
| Fe2O3 | 0.25 | 0.25 | 0.25 | 0.25 | 0.25 | 0.27 | 0.27 | 0.25 | 0.20 | 0.20 |
| SO3 | | | | | | 0.02 | 0.02 | | | |
| SiO2/RO | 2.18 | 2.15 | 2.21 | 2.16 | 2.13 | 2.16 | 2.05 | 2.23 | 2.37 | 2.43 |
| $T_{FORM}$ (° C.) | 1235 | 1232 | 1240 | 1240 | 1238 | 1230 | 1222 | 1239 | 1265 | 1268 |
| $T_{LIQ}$ (° C.) | 1164 | 1166 | 1167 | 1166 | 1165 | 1198 | 1215 | 1181 | 1164 | 1166 |
| ΔT (° C.) | 71 | 66 | 73 | 74 | 74 | 32 | 7 | 58 | 101 | 102 |

| Composition Weight % | Examples | | | | | | | | | |
|---|---|---|---|---|---|---|---|---|---|---|
| | 11 | 12 | 13 | 14 | 15 | 16 | 17 | 18 | 19 | 20 |
| SiO2 | 60.13 | 59.61 | 59.45 | 59.40 | 59.35 | 59.30 | 59.25 | 59.10 | 59.00 | 58.85 |
| Al2O3 | 12.27 | 12.16 | 12.20 | 12.20 | 12.20 | 12.20 | 12.20 | 12.20 | 12.20 | 12.20 |
| CaO | 22.92 | 23.51 | 23.55 | 23.60 | 23.65 | 23.70 | 23.75 | 23.90 | 24.00 | 24.15 |
| MgO | 2.50 | 2.62 | 2.55 | 2.55 | 2.55 | 2.55 | 2.55 | 2.55 | 2.55 | 2.55 |
| TiO2 | 1.00 | 1.00 | 1.10 | 1.10 | 1.10 | 1.10 | 1.10 | 1.10 | 1.10 | 1.10 |
| Na2O | 0.98 | 0.90 | 0.90 | 0.90 | 0.90 | 0.90 | 0.90 | 0.90 | 0.90 | 0.90 |
| K2O | | | | | | | | | | |
| Fe2O3 | 0.20 | 0.20 | 0.25 | 0.25 | 0.25 | 0.25 | 0.25 | 0.25 | 0.25 | 0.25 |
| SO3 | | | | | | | | | | |
| SiO2/RO | 2.37 | 2.28 | 2.28 | 2.27 | 2.27 | 2.26 | 2.25 | 2.23 | 2.22 | 2.20 |
| $T_{FORM}$ (° C.) | 1262 | 1251 | 1258 | 1250 | 1242 | 1248 | 1249 | 1247 | 1245 | 1242 |
| $T_{LIQ}$ (° C.) | 1164 | 1170 | 1173 | 1178 | 1176 | 1180 | 1178 | 1178 | 1178 | 1186 |
| ΔT (° C.) | 98 | 81 | 85 | 72 | 66 | 68 | 71 | 69 | 67 | 56 |

| Composition Weight % | Examples | | | | | | | | | |
|---|---|---|---|---|---|---|---|---|---|---|
| | 21 | 22 | 23 | 24 | 25 | 26 | 27 | 28 | 29 | 30 |
| SiO2 | 59.25 | 59.15 | 58.35 | 58.15 | 58.25 | 57.85 | 57.65 | 58.15 | 57.95 | 57.75 |
| Al2O3 | 12.40 | 12.60 | 13.20 | 13.20 | 13.40 | 13.40 | 13.40 | 13.20 | 13.20 | 13.20 |
| CaO | 23.55 | 23.45 | 23.65 | 23.85 | 23.55 | 23.95 | 24.15 | 23.85 | 24.05 | 24.25 |
| MgO | 2.55 | 2.55 | 2.55 | 2.55 | 2.55 | 2.55 | 2.55 | 2.55 | 2.55 | 2.55 |
| TiO2 | 1.10 | 1.10 | 1.10 | 1.10 | 1.10 | 1.10 | 1.10 | 1.10 | 1.10 | 1.10 |
| Na2O | 0.90 | 0.90 | 0.90 | 0.90 | 0.90 | 0.90 | 0.90 | 0.90 | 0.90 | 0.90 |
| K2O | | | | | | | | | | |
| Fe2O3 | 0.25 | 0.25 | 0.25 | 0.25 | 0.25 | 0.25 | 0.25 | 0.25 | 0.25 | 0.25 |
| SO3 | | | | | | | | | | |
| SiO2/RO | 2.27 | 2.28 | 2.23 | 2.20 | 2.23 | 2.18 | 2.16 | 2.20 | 2.18 | 2.15 |

TABLE A-continued

| | | | | | | | | | | |
|---|---|---|---|---|---|---|---|---|---|---|
| $T_{FORM}$ (°C.) | 1253 | 1253 | 1248 | 1245 | 1244 | 1243 | 1242 | 1249 | 1246 | 1243 |
| $T_{LIQ}$ (°C.) | 1171 | 1168 | 1162 | 1160 | 1174 | 1174 | 1169 | 1170 | 1171 | 1172 |
| ΔT (°C.) | 82 | 85 | 86 | 85 | 70 | 69 | 73 | 79 | 75 | 71 |

| Composition | Examples | | | |
|---|---|---|---|---|
| Weight % | 31 | 32 | 33 | 34 |
| SiO2 | 57.55 | 58.05 | 58.85 | 59.61 |
| Al2O3 | 13.20 | 13.40 | 13.40 | 12.16 |
| CaO | 24.45 | 23.75 | 23.95 | 23.51 |
| MgO | 2.55 | 2.55 | 2.55 | 2.62 |
| TiO2 | 1.10 | 1.10 | 1.10 | 1.00 |
| Na2O | 0.90 | 0.90 | 0.90 | 0.90 |
| K2O | | | | |
| Fe2O3 | 0.25 | 0.25 | 0.25 | 0.20 |
| SO3 | | | | |
| SiO2/RO | 2.13 | 2.21 | 2.22 | 2.28 |
| $T_{FORM}$ (°C.) | 1241 | 1246 | 1248 | 1251 |
| $T_{LIQ}$ (°C.) | 1164 | 1163 | 1171 | 1167 |
| ΔT (°C.) | 67 | 83 | 77 | 84 |

TABLE B

TYPE I-2 AND II-2 GLASS

| Composition | Examples | | | | | | | | | |
|---|---|---|---|---|---|---|---|---|---|---|
| Weight % | 35 | 36 | 37 | 38 | 39 | 40 | 41 | 42 | 43 | 44 |
| SiO2 | 57.75 | 57.75 | 56.75 | 57.15 | 57.25 | 58.55 | 55.40 | 55.80 | 56.20 | 55.75 |
| Al2O3 | 13.20 | 12.20 | 13.20 | 13.05 | 13.20 | 12.20 | 13.60 | 13.40 | 13.60 | 13.20 |
| CaO | 24.25 | 24.25 | 24.25 | 24.00 | 24.25 | 23.45 | 24.85 | 24.65 | 24.05 | 23.25 |
| MgO | 2.50 | 2.50 | 2.50 | 2.55 | 2.50 | 2.55 | 2.50 | 2.50 | 2.50 | 2.55 |
| TiO2 | 1.10 | 1.10 | 1.10 | 1.10 | 1.10 | 1.10 | 0.50 | 0.50 | 0.50 | 1.10 |
| Na2O | 0.90 | 0.90 | 0.90 | 0.90 | 0.90 | 0.90 | 0.90 | 0.90 | 0.90 | 0.90 |
| Fe2O3 | 0.25 | 0.25 | 0.25 | 0.25 | 0.25 | 0.25 | 0.25 | 0.25 | 0.25 | 0.25 |
| B2O3 | 1.00 | 1.00 | 1.00 | 1.00 | 1.00 | 1.00 | 2.00 | 2.00 | 2.00 | 3.00 |
| SiO2/RO | 2.16 | 2.16 | 2.12 | 2.15 | 2.14 | 2.25 | 2.03 | 2.06 | 2.12 | 2.16 |
| $T_{FORM}$ (°C.) | 1240 | 1227 | 1228 | 1235 | 1239 | 1236 | 1217 | 1211 | 1219 | 1204 |
| $T_{LIQ}$ (°C.) | 1178 | 1164 | 1161 | 1154 | 1159 | 1159 | 1153 | 1156 | 1136 | 1127 |
| ΔT (°C.) | 62 | 63 | 67 | 81 | 80 | 77 | 64 | 55 | 83 | 77 |

| Composition | Examples | | | | | | | | | |
|---|---|---|---|---|---|---|---|---|---|---|
| Weight % | 45 | 46 | 47 | 48 | 49 | 50 | 51 | 52 | 53 | 54 |
| SiO2 | 57.25 | 56.25 | 56.65 | 56.75 | 58.05 | 56.35 | 56.40 | 56.45 | 55.60 | 55.80 |
| Al2O3 | 12.20 | 13.20 | 13.05 | 13.20 | 12.20 | 13.60 | 13.60 | 13.55 | 13.60 | 13.60 |
| CaO | 23.75 | 23.75 | 23.50 | 23.25 | 22.95 | 23.85 | 23.80 | 23.80 | 24.65 | 24.45 |
| MgO | 2.50 | 2.50 | 2.55 | 2.55 | 2.55 | 2.55 | 2.55 | 2.55 | 2.50 | 2.50 |
| TiO2 | 1.10 | 1.10 | 1.10 | 1.10 | 1.10 | 0.50 | 0.50 | 0.50 | 0.50 | 0.50 |
| Na2O | 0.90 | 0.90 | 0.90 | 0.90 | 0.90 | 0.90 | 0.90 | 0.90 | 0.90 | 0.90 |
| Fe2O3 | 0.25 | 0.25 | 0.25 | 0.25 | 0.25 | 0.25 | 0.25 | 0.25 | 0.25 | 0.25 |
| B2O3 | 2.00 | 2.00 | 2.00 | 2.00 | 2.00 | 2.00 | 2.00 | 2.00 | 2.00 | 2.00 |
| SiO2/RO | 2.18 | 2.14 | 2.17 | 2.20 | 2.28 | 2.13 | 2.14 | 2.14 | 2.05 | 2.07 |
| $T_{FORM}$ (°C.) | 1227 | 1224 | 1225 | 1225 | 1225 | 1218 | 1219 | 1220 | 1211 | 1209 |
| $T_{LIQ}$ (°C.) | 1148 | 1149 | 1145 | 1147 | 1142 | 1138 | 1142 | 1137 | 1154 | 1156 |
| ΔT (°C.) | 79 | 75 | 80 | 78 | 83 | 80 | 77 | 83 | 57 | 53 |

| Composition | Examples | | | | | | | | | |
|---|---|---|---|---|---|---|---|---|---|---|
| Weight % | 55 | 56 | 57 | 58 | 59 | 60 | 61 | 62 | 63 | 64 |
| SiO2 | 56.50 | 56.60 | 56.40 | 56.0 | 56.40 | 56.20 | 56.00 | 56.00 | 55.80 | 56.50 |
| Al2O3 | 13.55 | 13.40 | 13.40 | 13.60 | 13.60 | 13.80 | 13.80 | 13.60 | 13.60 | 13.20 |
| CaO | 23.85 | 23.85 | 24.05 | 24.25 | 23.85 | 23.85 | 24.05 | 24.25 | 24.45 | 23.50 |
| MgO | 2.55 | 2.50 | 2.50 | 2.50 | 2.50 | 2.50 | 2.50 | 2.50 | 2.50 | 2.55 |
| TiO2 | 0.50 | 0.50 | 0.50 | 0.50 | 0.50 | 0.50 | 0.50 | 0.50 | 0.50 | 1.10 |
| Na2O | 0.90 | 0.90 | 0.90 | 0.90 | 0.90 | 0.90 | 0.90 | 0.90 | 0.90 | 0.90 |
| Fe2O3 | 0.25 | 0.25 | 0.25 | 0.25 | 0.25 | 0.25 | 0.25 | 0.25 | 0.25 | 0.25 |
| B2O3 | 2.00 | 2.00 | 2.00 | 2.00 | 2.00 | 2.00 | 2.00 | 2.00 | 2.00 | 2.00 |
| SiO2/RO | 2.14 | 2.15 | 2.12 | 2.09 | 2.14 | 2.13 | 2.11 | 2.09 | 2.07 | 2.16 |
| $T_{FORM}$ (°C.) | 1217 | 1222 | 1216 | 1213 | 1220 | 1223 | 1219 | 1202 | 1222 | 1220 |
| $T_{LIQ}$ (°C.) | 1135 | 1139 | 1143 | 1136 | 1139 | 1158 | 1151 | 1137 | 1153 | 1133 |
| ΔT (°C.) | 82 | 83 | 73 | 77 | 81 | 65 | 68 | 65 | 69 | 87 |

TABLE B-continued

| Composition | Examples | | | | | | | | | |
|---|---|---|---|---|---|---|---|---|---|---|
| Weight % | 65 | 66 | 67 | 68 | 69 | 70 | 71 | 72 | 73 | 74 |
| SiO2 | 57.25 | 56.75 | 56.25 | 56.75 | 56.65 | 56.80 | 56.40 | 55.80 | 55.60 | 55.00 |
| Al2O3 | 13.20 | 13.20 | 13.20 | 13.45 | 13.05 | 13.40 | 13.80 | 13.80 | 13.40 | 13.80 |
| CaO | 22.75 | 23.75 | 23.75 | 23.00 | 23.50 | 23.65 | 23.65 | 24.25 | 24.85 | 25.05 |
| MgO | 2.50 | 2.05 | 2.55 | 2.55 | 2.55 | 2.50 | 2.50 | 2.50 | 2.50 | 2.50 |
| TiO2 | 1.10 | 1.10 | 1.10 | 1.10 | 1.10 | 0.50 | 0.50 | 0.50 | 0.50 | 0.50 |
| Na2O | 0.90 | 0.90 | 0.90 | 0.90 | 0.90 | 0.90 | 0.90 | 0.90 | 0.90 | 0.90 |
| Fe2O3 | 0.25 | 0.25 | 0.25 | 0.25 | 0.25 | 0.25 | 0.25 | 0.25 | 0.25 | 0.25 |
| B2O3 | 2.00 | 2.00 | 2.00 | 2.00 | 2.00 | 2.00 | 2.00 | 2.00 | 2.00 | 2.00 |
| SiO2/RO | 2.27 | 2.20 | 2.14 | 2.22 | 2.17 | 2.17 | 2.16 | 2.09 | 2.03 | 2.00 |
| $T_{FORM}$ (° C.) | 1237 | 1230 | 1220 | 1227 | 1218 | 1228 | 1197 | 1222 | 1209 | 1206 |
| $T_{LIQ}$ (° C.) | 1149 | 1141 | 1131 | 1131 | 1131 | 1141 | 1156 | 1137 | 1168 | 1169 |
| ΔT (° C.) | 86 | 89 | 89 | 96 | 87 | 87 | 41 | 85 | 41 | 37 |

| Composition | Examples | | | | | | | | |
|---|---|---|---|---|---|---|---|---|---|
| Weight % | 75 | 76 | 77 | 78 | 79 | 80 | 81 | 82 | 83 |
| SiO2 | 56.75 | 56.15 | 56.25 | 58.61 | 59.01 | 58.70 | 57.75 | 59.05 | 59.11 |
| Al2O3 | 13.20 | 13.05 | 13.20 | 12.16 | 12.04 | 13.35 | 13.20 | 12.20 | 12.16 |
| CaO | 22.25 | 23.00 | 23.25 | 23.50 | 23.27 | 23.50 | 23.25 | 23.95 | 23.00 |
| MgO | 2.55 | 2.55 | 2.55 | 2.50 | 2.48 | 2.50 | 2.50 | 2.55 | 2.50 |
| TiO2 | 1.10 | 1.10 | 1.10 | 1.10 | 1.09 | 0.50 | 1.10 | 1.10 | 1.10 |
| Na2O | 0.90 | 0.90 | 0.90 | 0.90 | 0.89 | 0.30 | 0.90 | 0.90 | 0.90 |
| Fe2O3 | 0.25 | 0.25 | 0.25 | 0.23 | 0.23 | 0.25 | 0.25 | 0.25 | 0.23 |
| B2O3 | 3.00 | 3.00 | 3.00 | 1.00 | 1.00 | 0.90 | 1.00 | 1.00 | 1.00 |
| SiO2/RO | 2.29 | 2.20 | 2.18 | 2.25 | 2.29 | 2.26 | 2.24 | 2.23 | 2.32 |
| $T_{FORM}$ (° C.) | 1221 | 1212 | 1214 | 1242 | 1252 | 1253 | 1250 | 1254 | 1248 |
| $T_{LIQ}$ (° C.) | 1121 | 1178 | 1114 | 1161 | 1178 | 1145 | 1154 | 1183 | 1152 |
| ΔT (° C.) | 100 | 34 | 100 | 81 | 74 | 108 | 96 | 71 | 96 |

TABLE C

TYPE III-1 GLASS

| Composition | Examples | | | | | | | | | |
|---|---|---|---|---|---|---|---|---|---|---|
| Weight % | 84 | 85 | 86 | 87 | 88 | 89 | 90 | 91 | 92 | 93 |
| SiO2 | 58.70 | 58.70 | 58.35 | 58.25 | 58.86 | 58.76 | 57.95 | 57.65 | 58.96 | 58.15 |
| Al2O3 | 13.35 | 13.35 | 13.20 | 13.40 | 13.44 | 13.64 | 13.20 | 13.40 | 13.24 | 13.20 |
| CaO | 23.50 | 23.50 | 23.65 | 23.55 | 23.55 | 23.45 | 24.05 | 24.15 | 23.65 | 23.85 |
| MgO | 2.50 | 2.50 | 2.55 | 2.55 | 2.50 | 2.50 | 2.55 | 2.55 | 2.50 | 2.55 |
| TiO2 | 0.50 | 0.50 | 1.10 | 1.10 | 0.50 | 0.50 | 1.10 | 1.10 | 0.50 | 1.10 |
| Na2O | 0.60 | 0.30 | | | | | | | | |
| Li2O | 0.60 | 0.90 | 0.90 | 0.90 | 0.90 | 0.90 | 0.90 | 0.90 | 0.90 | 0.90 |
| Fe2O3 | 0.25 | 0.25 | 0.25 | 0.25 | 0.25 | 0.25 | 0.25 | 0.25 | 0.25 | 0.25 |
| SiO2/RO | 2.26 | 2.26 | 2.23 | 2.23 | 2.26 | 2.26 | 2.18 | 2.16 | 2.25 | 2.20 |
| $T_{FORM}$ (° C.) | 1226 | 1211 | 1211 | 1215 | 1216 | 1218 | 1205 | 1206 | 1212 | 1237 |
| $T_{LIQ}$ (° C.) | 1157 | 1153 | 1146 | 1153 | 1153 | 1150 | 1151 | 1154 | 1158 | 1172 |
| ΔT (° C.) | 69 | 58 | 65 | 62 | 63 | 68 | 54 | 52 | 54 | 65 |

| Composition | Examples | | | | | | | | | |
|---|---|---|---|---|---|---|---|---|---|---|
| Weight % | 94 | 95 | 96 | 97 | 98 | 99 | 100 | 101 | 102 | 103 |
| SiO2 | 59.61 | 59.97 | 60.09 | 60.21 | 60.33 | 59.61 | 59.61 | 59.73 | 59.85 | 59.97 |
| Al2O3 | 12.12 | 12.19 | 12.22 | 12.24 | 12.27 | 12.92 | 12.92 | 12.92 | 12.95 | 12.97 |
| CaO | 22.12 | 23.56 | 23.31 | 23.35 | 23.40 | 21.91 | 21.96 | 22.00 | 22.04 | 22.09 |
| MgO | 3.50 | 2.90 | 2.70 | 2.50 | 2.30 | 3.50 | 3.30 | 3.10 | 2.90 | 2.70 |
| TiO2 | 0.50 | 0.50 | 0.50 | 0.50 | 0.50 | 1.10 | 1.10 | 1.10 | 1.10 | 1.10 |
| Na2O | | | | | | | | | | |
| Li2O | 0.90 | 0.90 | 0.90 | 0.90 | 0.90 | 0.90 | 0.90 | 0.90 | 0.90 | 0.90 |
| Fe2O3 | 0.25 | 0.25 | 0.25 | 0.25 | 0.25 | 0.25 | 0.25 | 0.25 | 0.25 | 0.25 |
| SiO2/RO | 2.33 | 2.27 | 2.31 | 2.33 | 2.35 | 2.35 | 2.36 | 2.38 | 2.40 | 2.42 |
| $T_{FORM}$ (° C.) | 1205 | 1207 | 1217 | 1213 | 1216 | 1213 | 1213 | 1214 | 1214 | 1219 |
| $T_{LIQ}$ (° C.) | 1190 | 1170 | 1163 | 1162 | 1166 | 1179 | 1170 | 1164 | 1161 | 1160 |
| ΔT (° C.) | 15 | 37 | 54 | 51 | 50 | 34 | 43 | 50 | 53 | 59 |

| Composition | Examples | | | | | | | | | |
|---|---|---|---|---|---|---|---|---|---|---|
| Weight % | 104 | 105 | 106 | 107 | 108 | 109 | 110 | 111 | 112 | 113 |

TABLE C-continued

| | | | | | | | | | | |
|---|---|---|---|---|---|---|---|---|---|---|
| SiO2 | 60.09 | 60.21 | 60.00 | 60.57 | 59.80 | 59.75 | 59.65 | 59.60 | 59.55 | 59.50 |
| Al2O3 | 13.00 | 13.02 | 12.50 | 13.10 | 12.25 | 12.25 | 12.25 | 12.25 | 12.25 | 12.25 |
| CaO | 22.13 | 22.18 | 23.70 | 22.31 | 22.60 | 22.85 | 23.35 | 23.60 | 23.85 | 24.10 |
| MgO | 2.50 | 2.30 | 1.90 | 1.70 | 3.10 | 2.90 | 2.50 | 2.30 | 2.10 | 1.90 |
| TiO2 | 1.10 | 1.10 | 1.10 | 1.10 | 1.10 | 1.10 | 1.10 | 1.10 | 1.10 | 1.10 |
| Na2O | | | | | 0.30 | 0.30 | 0.30 | 0.30 | 0.30 | 0.30 |
| Li2O | 0.90 | 0.90 | 0.90 | 0.90 | 0.60 | 0.60 | 0.60 | 0.60 | 0.60 | 0.60 |
| Fe2O3 | 0.25 | 0.25 | 0.25 | 0.25 | | | | | | |
| SiO2/RO | 2.44 | 2.46 | 2.34 | 2.52 | 2.33 | 2.32 | 2.31 | 2.30 | 2.29 | 2.29 |
| $T_{FORM}$ (°C.) | 1223 | 1233 | 1239 | 1239 | 1240 | 1236 | 1236 | 1238 | 1234 | 1234 |
| $T_{LIQ}$ (°C.) | 1155 | 1142 | 1139 | 1141 | 1156 | 1156 | 1159 | 1167 | 1173 | 1181 |
| $\Delta T$ (°C.) | 68 | 91 | 100 | 98 | 94 | 80 | 77 | 71 | 61 | 53 |

| Composition | Examples | | | | | | | | | |
|---|---|---|---|---|---|---|---|---|---|---|
| Weight % | 114 | 115 | 116 | 117 | 118 | 119 | 120 | 121 | 122 | 123 |
| SiO2 | 59.45 | 60.00 | 59.95 | 59.90 | 59.85 | 59.61 | 59.97 | 60.09 | 60.21 | 60.33 |
| Al2O3 | 12.25 | 12.40 | 12.40 | 12.40 | 12.0 | 12.12 | 12.19 | 12.22 | 12.24 | 12.27 |
| CaO | 24.35 | 22.05 | 23.30 | 23.55 | 23.80 | 22.12 | 22.25 | 22.30 | 22.34 | 22.39 |
| MgO | 1.70 | 2.30 | 2.10 | 1.90 | 1.70 | 3.50 | 2.90 | 2.70 | 2.50 | 2.30 |
| TiO2 | 1.10 | 1.10 | 1.10 | 1.10 | 1.10 | 1.50 | 1.50 | 1.50 | 1.50 | 1.50 |
| Na2O | 0.30 | | | | | | | | | |
| Li2O | 0.60 | 0.90 | 0.90 | 0.90 | 0.90 | 0.90 | 0.90 | 0.90 | 0.90 | 0.90 |
| Fe2O3 | | 0.25 | 0.25 | 0.26 | 0.25 | 0.25 | 0.25 | 0.25 | 0.25 | 0.25 |
| SiO2/RO | 2.28 | 2.46 | 2.36 | 2.35 | 2.35 | 2.33 | 2.38 | 2.40 | 2.42 | 2.44 |
| $T_{FORM}$ (°C.) | 1234 | 1230 | 1231 | 1224 | 1224 | 1215 | 1217 | 1213 | 1215 | 1231 |
| $T_{LIQ}$ (°C.) | 1192 | 1146 | 1152 | 1156 | 1156 | 1181 | 1161 | 1178 | 1162 | 1160 |
| $\Delta T$ (°C.) | 42 | 84 | 79 | 68 | 68 | 34 | 56 | 35 | 53 | 71 |

| Composition | Examples | | | | | | | | | |
|---|---|---|---|---|---|---|---|---|---|---|
| Weight % | 124 | 125 | 126 | 127 | 128 | 129 | 130 | 131 | 132 | 133 |
| SiO2 | 60.75 | 60.21 | 59.78 | 58.70 | 57.75 | 58.05 | 57.85 | 59.71 | 59.46 | 60.02 |
| Al2O3 | 12.35 | 13.02 | 12.30 | 13.35 | 13.20 | 13.40 | 13.40 | 13.24 | 13.24 | 12.35 |
| CaO | 22.55 | 22.52 | 23.26 | 23.50 | 24.25 | 23.75 | 23.95 | 22.90 | 23.15 | 23.35 |
| MgO | 1.70 | 2.50 | 2.53 | 2.50 | 2.55 | 2.55 | 2.55 | 2.50 | 2.50 | 2.54 |
| TiO2 | 1.50 | 0.50 | 0.50 | 0.50 | 1.10 | 1.10 | 1.10 | 0.50 | 0.50 | 0.50 |
| Na2O | | 0.00 | | | | | | | | |
| Li2O | 0.90 | 1.00 | 1.40 | 1.20 | 0.90 | 0.90 | 0.90 | 0.90 | 0.90 | 1.00 |
| Fe2O3 | 0.25 | 0.25 | 0.23 | 0.25 | 0.25 | 0.25 | 0.25 | 0.25 | 0.25 | 0.23 |
| SiO2/RO | 2.51 | 2.41 | 2.32 | 2.26 | 2.15 | 2.21 | 2.18 | 2.35 | 2.32 | 2.32 |
| $T_{FORM}$ (°C.) | 1240 | 1231 | 1187 | 1194 | 1201 | 1202 | 1199 | 1227 | 1226 | 1209 |
| $T_{LIQ}$ (°C.) | 1166 | 1143 | 1158 | 1149 | 1155 | 1153 | 1157 | 1142 | 1147 | 1159 |
| $\Delta T$ (°C.) | 74 | 88 | 29 | 45 | 46 | 49 | 42 | 85 | 79 | 50 |

| Composition | Examples | | | | | | | | | |
|---|---|---|---|---|---|---|---|---|---|---|
| Weight % | 134 | 135 | 136 | 137 | 138 | 139 | 140 | 141 | 142 | 143 |
| SiO2 | 59.90 | 60.26 | 60.14 | 59.16 | 60.10 | 60.23 | 60.10 | 60.23 | 59.78 | 60.14 |
| Al2O3 | 12.32 | 12.40 | 12.37 | 13.24 | 13.00 | 12.25 | 13.00 | 12.25 | 12.30 | 12.37 |
| CaO | 23.31 | 23.45 | 23.40 | 23.45 | 22.15 | 23.36 | 22.15 | 23.36 | 23.26 | 23.40 |
| MgO | 2.53 | 2.55 | 2.54 | 2.50 | 2.50 | 2.50 | 2.50 | 2.50 | 2.53 | 2.54 |
| TiO2 | 0.50 | 0.51 | 0.51 | 0.50 | 1.10 | 0.51 | 1.10 | 0.51 | 0.50 | 0.51 |
| Na2O | | | | | | | | | | |
| Li2O | 1.20 | 0.60 | 0.80 | 0.90 | 0.90 | 0.90 | 0.90 | 0.90 | 1.40 | 0.80 |
| Fe2O3 | 0.23 | 0.23 | 0.23 | 0.25 | 0.25 | 0.25 | 0.25 | 0.25 | 0.23 | 0.23 |
| SiO2/RO | 2.32 | 2.32 | 2.32 | 2.28 | 2.44 | 2.33 | 2.44 | 2.33 | 2.32 | 2.32 |
| $T_{FORM}$ (°C.) | 1199 | 1230 | 1219 | 1218 | 1235 | 1220 | 1237 | 1224 | 1198 | 1219 |
| $T_{LIQ}$ (°C.) | 1160 | 1158 | 1159 | 1156 | 1133 | 1160 | 1136 | 1158 | 1156 | 1159 |
| $\Delta T$ (°C.) | 39 | 72 | 60 | 62 | 102 | 60 | 101 | 66 | 42 | 60 |

| Composition | Examples | | | | | | | |
|---|---|---|---|---|---|---|---|---|
| Weight % | 144 | 145 | 146 | 147 | 148 | 149 | 150 | 151 |
| SiO2 | 60.38 | 60.33 | 59.70 | 60.21 | 60.21 | 60.21 | 60.50 | 58.70 |
| Al2O3 | 12.42 | 13.05 | 12.25 | 13.02 | 13.02 | 13.02 | 12.45 | 13.35 |
| CaO | 23.50 | 22.22 | 22.85 | 22.52 | 22.52 | 22.52 | 23.54 | 23.50 |
| MgO | 2.55 | 2.10 | 2.70 | 2.50 | 2.50 | 2.50 | 2.56 | 2.50 |
| TiO2 | 0.51 | 1.10 | 1.10 | 0.50 | 0.50 | 0.50 | 0.51 | 0.50 |
| Na2O | | | 0.30 | 0.25 | 0.50 | 0.75 | | 0.90 |
| Li2O | 0.40 | 0.90 | 0.60 | 0.75 | 0.50 | 0.25 | 0.20 | 0.30 |
| Fe2O3 | 0.23 | 0.25 | | 0.25 | 0.25 | 0.25 | 0.24 | 0.25 |
| SiO2/RO | 2.32 | 2.48 | 2.34 | 2.41 | 2.41 | 2.41 | 2.32 | 2.26 |
| $T_{FORM}$ (°C.) | 1244 | 1258 | 1242 | 1242 | 1253 | 1263 | 1256 | 1241 |

TABLE C-continued

| | | | | | | | | |
|---|---|---|---|---|---|---|---|---|
| $T_{LIQ}$ (° C.) | 1158 | 1136 | 1155 | 1147 | 1152 | 1160 | 1158 | 1165 |
| ΔT (° C.) | 86 | 122 | 87 | 95 | 101 | 103 | 98 | 76 |

| Composition | Examples | | | | |
|---|---|---|---|---|---|
| Weight % | 152 | 153 | 154 | 155 | 156* |
| SiO2 | 60.05 | 60.05 | 60.05 | 59.30 | 59.30 |
| Al2O3 | 12.98 | 12.98 | 12.98 | 12.10 | 12.10 |
| CaO | 22.14 | 22.14 | 22.14 | 22.60 | 22.60 |
| MgO | 3.12 | 3.12 | 3.12 | 3.40 | 3.40 |
| TiO2 | 0.55 | 0.55 | 0.55 | 1.50 | 1.50 |
| Na2O | | | | 0.45 | |
| Li2O | 0.91 | 0.91 | 0.91 | 0.45 | 0.90 |
| Fe2O3 | 0.25 | 0.25 | 0.25 | 0.20 | 0.20 |
| SiO2/RO | 2.38 | 2.38 | 2.38 | 2.28 | 2.28 |
| $T_{FORM}$ (° C.) (NIST 710A) | 1214 | 1219 | 1223 | 1218 | 1191 |
| $T_{LIQ}$ (° C.) | 1159 | 1164 | 1163 | 1179 | 1187 |
| ΔT (° C.) | 55 | 55 | 60 | 39 | 4 |

* composition included 0.50 wt % BaO

TABLE D

TYPE III-2 GLASS

| Composition | Examples | | | | | | | | | |
|---|---|---|---|---|---|---|---|---|---|---|
| Weight % | 157 | 158 | 159 | 160 | 161 | 162 | 163 | 164 | 165 | 166 |
| SiO2 | 58.25 | 58.30 | 58.20 | 58.10 | 58.00 | 58.15 | 58.15 | 58.10 | 57.35 | 57.95 |
| Al2O3 | 13.33 | 13.03 | 13.03 | 13.03 | 13.03 | 13.20 | 13.33 | 13.63 | 13.20 | 13.20 |
| CaO | 23.29 | 23.54 | 23.64 | 23.74 | 23.84 | 22.85 | 23.39 | 23.14 | 23.65 | 24.05 |
| MgO | 2.50 | 2.50 | 2.50 | 2.50 | 2.50 | 2.55 | 2.50 | 2.50 | 2.55 | 2.55 |
| TiO2 | 0.50 | 0.50 | 0.50 | 0.50 | 0.50 | 1.10 | 0.50 | 0.50 | 1.10 | 1.10 |
| Na2O | | | | | | | | | | |
| Li2O | 0.90 | 0.90 | 0.90 | 0.90 | 0.90 | 0.90 | 0.90 | 0.90 | 0.90 | 0.90 |
| ZnO | 1.00 | 1.00 | 1.00 | 1.00 | 1.00 | 1.00 | 1.00 | 1.00 | 1.00 | 1.00 |
| Fe2O3 | 0.23 | 0.23 | 0.23 | 0.23 | 0.23 | 0.25 | 0.23 | 0.23 | 0.25 | 0.25 |
| SiO2/RO | 2.26 | 2.24 | 2.23 | 2.21 | 2.20 | 2.29 | 2.25 | 2.26 | 2.19 | 2.18 |
| $T_{FORM}$ (° C.) | 1213 | 1204 | 1205 | 1206 | 1208 | 1207 | 1208 | 1212 | 1195 | 1195 |
| $T_{LIQ}$ (° C.) | 1146 | 1147 | 1148 | 1144 | 1149 | 1136 | 1152 | 1157 | 1141 | 1140 |
| ΔT (° C.) | 67 | 57 | 57 | 62 | 59 | 71 | 56 | 55 | 54 | 55 |

| Composition | Examples | | | | | | | | | |
|---|---|---|---|---|---|---|---|---|---|---|
| Weight % | 167 | 168 | 169 | 170 | 171 | 172 | 173 | 174 | 175 | 176 |
| SiO2 | 59.61 | 59.47 | 59.12 | 57.75 | 58.00 | 59.73 | 59.85 | 59.97 | 60.09 | 60.21 |
| Al2O3 | 12.16 | 12.16 | 12.00 | 13.20 | 13.63 | 12.92 | 12.95 | 12.97 | 13.00 | 13.02 |
| CaO | 23.50 | 24.22 | 22.50 | 24.25 | 23.24 | 22.00 | 22.04 | 22.09 | 22.13 | 22.18 |
| MgO | 2.50 | 1.90 | 3.40 | 2.55 | 2.50 | 3.10 | 2.90 | 2.70 | 2.50 | 2.30 |
| TiO2 | 1.10 | 1.10 | 1.00 | 1.10 | 0.50 | 1.10 | 1.10 | 1.10 | 1.10 | 1.10 |
| Na2O | | | | | | | | | | |
| Li2O | 0.45 | 0.45 | 0.90 | 0.90 | 0.90 | 0.45 | 0.45 | 0.45 | 0.45 | 0.45 |
| ZnO | 0.45 | 0.45 | 1.00 | 1.00 | 1.00 | 0.45 | 0.45 | 0.45 | 0.45 | 0.45 |
| Fe2O3 | | | 0.20 | 0.25 | 0.23 | 0.25 | 0.25 | 0.25 | 0.25 | 0.25 |
| SiO2/RO | 2.29 | 2.28 | 2.28 | 2.15 | 2.25 | 2.38 | 2.40 | 2.42 | 2.44 | 2.46 |
| $T_{FORM}$ (° C.) | 1229 | 1218 | 1190 | 1194 | 1212 | 1242 | 1246 | 1246 | 1251 | 1251 |
| $T_{LIQ}$ (° C.) | 1154 | 1159 | 1163 | 1159 | 1163 | 1173 | 1168 | 1154 | 1147 | 1144 |
| ΔT (° C.) | 75 | 59 | 27 | 35 | 49 | 69 | 78 | 92 | 104 | 107 |

| Composition | Examples | | | | | | |
|---|---|---|---|---|---|---|---|
| Weight % | 177 | 178 | 179 | 180 | 181 | 182 | 183 |
| SiO2 | 60.33 | 60.45 | 60.57 | 59.40 | 59.20 | 59.54 | 59.40 |
| Al2O3 | 13.05 | 13.08 | 13.10 | 12.16 | 12.16 | 12.16 | 12.16 |
| CaO | 22.22 | 22.27 | 22.31 | 23.49 | 23.69 | 23.95 | 24.49 |
| MgO | 2.10 | 1.90 | 1.70 | 2.30 | 2.30 | 2.10 | 1.70 |
| TiO2 | 1.10 | 1.10 | 1.10 | 1.10 | 1.10 | 1.10 | 1.10 |
| Na2O | | | | 0.40 | 0.40 | | |
| Li2O | 0.45 | 0.45 | 0.45 | 0.45 | 0.45 | 0.45 | 0.45 |
| ZnO | 0.45 | 0.45 | 0.45 | 0.45 | 0.45 | 0.45 | 0.45 |
| Fe2O3 | 0.25 | 0.25 | 0.25 | | | | |
| SiO2/RO | 2.48 | 2.50 | 2.52 | 2.30 | 2.28 | 2.29 | 2.27 |

TABLE D-continued

| | | | | | | | |
|---|---|---|---|---|---|---|---|
| $T_{FORM}$ (° C.) | 1260 | 1260 | 1263 | 1245 | 1247 | 1241 | 1245 |
| $T_{LIQ}$ (° C.) | 1140 | 1139 | 1135 | 1159 | 1152 | 1155 | 1168 |
| ΔT (° C.) | 120 | 121 | 128 | 86 | 95 | 86 | 77 |

TABLE E

TYPE III-3 GLASS

| Composition Weight % | Examples | | | | | | | | | |
|---|---|---|---|---|---|---|---|---|---|---|
| | 184 | 185 | 186 | 187 | 188 | 189 | 190 | 191 | 192 | 193 |
| SiO2 | 59.73 | 59.85 | 59.97 | 60.09 | 60.21 | 60.33 | 60.45 | 60.57 | 58.80 | 58.70 |
| Al2O3 | 12.92 | 12.95 | 12.97 | 13.00 | 13.02 | 13.05 | 13.08 | 13.10 | 13.00 | 11.90 |
| CaO | 22.00 | 22.04 | 22.09 | 22.13 | 22.18 | 22.22 | 22.27 | 22.31 | 23.45 | 22.40 |
| MgO | 3.10 | 2.90 | 2.70 | 2.50 | 2.30 | 2.10 | 1.90 | 1.70 | 2.50 | 3.40 |
| TiO2 | 1.10 | 1.10 | 1.10 | 1.10 | 1.10 | 1.10 | 1.10 | 1.10 | 1.10 | 1.50 |
| ZnO | 0.90 | 0.90 | 0.90 | 0.90 | 0.90 | 0.90 | 0.90 | 0.90 | 0.90 | 1.00 |
| Na2O | | | | | | | | | | 0.90 |
| K2O | | | | | | | | | | |
| Fe2O3 | 0.25 | 0.25 | 0.25 | 0.25 | 0.25 | 0.25 | 0.25 | 0.25 | 0.25 | 0.20 |
| SiO2/RO | 2.38 | 2.40 | 2.42 | 2.44 | 2.46 | 2.48 | 2.50 | 2.52 | 2.27 | 2.28 |
| $T_{FORM}$ (° C.) | 1265 | 1267 | 1273 | 1278 | 1273 | 1280 | 1285 | 1275 | 1268 | 1226 |
| $T_{LIQ}$ (° C.) | 1170 | 1166 | 1159 | 1157 | 1166 | 1169 | 1170 | 1171 | 1165 | 1180 |
| ΔT (° C.) | 95 | 101 | 114 | 121 | 107 | 111 | 115 | 104 | 103 | 46 |

| Composition Weight % | Examples | | | |
|---|---|---|---|---|
| | 194 | 195 | 196 | 197 |
| SiO2 | 59.00 | 58.70 | 58.19 | 59.00 |
| Al2O3 | 12.00 | 11.90 | 11.84 | 12.00 |
| CaO | 22.50 | 22.40 | 21.33 | 22.50 |
| MgO | 3.40 | 3.40 | 2.82 | 3.40 |
| TiO2 | 1.00 | 1.00 | 1.86 | 1.50 |
| ZnO | 1.00 | 1.50 | 2.28 | 0.50 |
| Na2O | 0.90 | 0.90 | 1.18 | 0.90 |
| K2O | | | 0.16 | |
| Fe2O3 | 0.20 | 0.20 | 0.24 | 0.20 |
| SiO2/RO | 2.28 | 2.28 | 2.24 | 2.28 |
| $T_{FORM}$ (° C.) (NIST 710A) | 1234 | 1231 | 1212 | 1230 |
| $T_{LIQ}$ (° C.) | 1175 | 1181 | 1159 | 1183 |
| ΔT (° C.) | 69 | 50 | 53 | 37 |

TABLE F

TYPE III-4 GLASS

| Composition Weight % | Examples | | | | | | | | | |
|---|---|---|---|---|---|---|---|---|---|---|
| | 198 | 199 | 200 | 201 | 202 | 203 | 204 | 205 | 206 | 207 |
| SiO2 | 58.00 | 57.90 | 57.80 | 58.15 | 58.25 | 58.00 | 58.10 | 58.30 | 58.20 | 58.10 |
| Al2O3 | 13.43 | 13.43 | 13.43 | 13.33 | 13.33 | 13.63 | 13.63 | 13.03 | 13.03 | 13.03 |
| CaO | 23.44 | 23.54 | 23.64 | 23.39 | 23.29 | 23.24 | 23.14 | 23.54 | 23.64 | 23.74 |
| MgO | 2.50 | 2.50 | 2.50 | 2.50 | 2.50 | 2.50 | 2.50 | 2.50 | 2.50 | 2.50 |
| TiO2 | 0.50 | 0.50 | 0.50 | 0.50 | 0.50 | 0.50 | 0.50 | 0.50 | 0.50 | 0.50 |
| B2O3 | 1.00 | 1.00 | 1.00 | 1.00 | 1.00 | 1.00 | 1.00 | 1.00 | 1.00 | 1.00 |
| Na2O | | | | | | | | | | |
| K2O | | | | | | | | | | |
| Li2O | 0.90 | 0.90 | 0.90 | 0.90 | 0.90 | 0.90 | 0.90 | 0.90 | 0.90 | 0.90 |
| Fe2O3 | 0.23 | 0.23 | 0.23 | 0.23 | 0.23 | 0.23 | 0.23 | 0.23 | 0.23 | 0.23 |
| SiO2/RO | 2.24 | 2.22 | 2.21 | 2.25 | 2.26 | 2.25 | 2.27 | 2.24 | 2.23 | 2.21 |
| $T_{FORM}$ (° C.) | 1202 | 1203 | 1197 | 1203 | 1202 | 1207 | 1212 | 1200 | 1201 | 1194 |
| $T_{LIQ}$ (° C.) | 1139 | 1137 | 1139 | 1136 | 1145 | 1144 | 1146 | 1132 | 1137 | 1135 |
| ΔT (° C.) | 63 | 66 | 58 | 67 | 57 | 63 | 66 | 68 | 64 | 59 |

| Composition Weight % | Examples | | | | | | | | | |
|---|---|---|---|---|---|---|---|---|---|---|
| | 208* | 209* | 210* | 211 | 212 | 213 | 214 | 215 | 216 | 217 |
| SiO2 | 58.74 | 58.64 | 58.64 | 58.75 | 58.00 | 57.80 | 57.60 | 57.60 | 57.60 | 57.60 |
| Al2O3 | 13.05 | 13.15 | 12.95 | 12.93 | 13.03 | 13.23 | 13.23 | 13.23 | 13.23 | 13.03 |

TABLE F-continued

| | | | | | | | | | | |
|---|---|---|---|---|---|---|---|---|---|---|
| CaO | 22.97 | 22.97 | 22.87 | 22.93 | 23.84 | 23.84 | 23.84 | 23.84 | 23.84 | 24.04 |
| MgO | 2.36 | 2.36 | 2.36 | 2.36 | 2.50 | 2.50 | 2.50 | 2.50 | 2.50 | 2.50 |
| TiO2 | 0.49 | 0.49 | 0.49 | 0.50 | 0.50 | 0.50 | 0.50 | 0.50 | 0.50 | 0.50 |
| B2O3 | 1.00 | 1.00 | 1.00 | 1.20 | 1.00 | 1.00 | 1.20 | 1.20 | 1.20 | 1.20 |
| Na2O | | | | 0.04 | | | | | 0.10 | 0.20 | 0.20 |
| K2O | 0.09 | 0.09 | 0.09 | 0.10 | | | | | | |
| Li2O | 0.91 | 0.91 | 0.91 | 0.90 | 0.90 | 0.90 | 0.90 | 0.80 | 0.70 | 0.70 |
| Fe2O3 | 0.29 | 0.29 | 0.29 | 0.29 | 0.23 | 0.23 | 0.23 | 0.23 | 0.23 | 0.23 |
| SiO2/RO | 2.32 | 2.32 | 2.32 | 2.32 | 2.20 | 2.19 | 2.19 | 2.19 | 2.19 | 2.17 |
| $T_{FORM}$ (° C.) | 1210 | 1209 | 1204 | 1210 | 1198 | 1201 | 1200 | 1196 | 1208 | 1201 |
| $T_{LIQ}$ (° C.) | 1145 | 1151 | 1142 | 1127 | 1138 | 1126 | 1125 | 1133 | 1135 | 1145 |
| ΔT (° C.) | 65 | 58 | 62 | 83 | 60 | 75 | 75 | 63 | 73 | 56 |

| Composition | Examples | | | | | | | | | |
|---|---|---|---|---|---|---|---|---|---|---|
| Weight % | 218 | 219 | 220 | 221 | 222 | 223 | 224 | 225 | 226 | 227 |
| SiO2 | 58.50 | 58.40 | 58.30 | 58.40 | 58.15 | 58.25 | 58.70 | 58.00 | 57.60 | 58.00 |
| Al2O3 | 12.76 | 12.76 | 13.03 | 13.03 | 13.33 | 13.33 | 12.75 | 13.03 | 13.03 | 13.03 |
| CaO | 23.61 | 23.71 | 23.54 | 23.44 | 23.39 | 23.29 | 23.50 | 23.84 | 24.04 | 23.84 |
| MgO | 2.50 | 2.50 | 2.50 | 2.50 | 2.50 | 2.50 | 2.50 | 2.50 | 2.50 | 2.50 |
| TiO2 | 0.50 | 0.50 | 0.50 | 0.50 | 0.50 | 0.50 | 0.50 | 0.50 | 0.50 | 0.50 |
| B2O3 | 1.00 | 1.00 | 1.00 | 1.00 | 1.00 | 1.00 | 0.60 | 1.00 | 1.20 | 1.00 |
| Na2O | | | | | | | 0.60 | | | |
| K2O | | | | | | | | | | |
| Li2O | 0.90 | 0.90 | 0.90 | 0.90 | 0.90 | 0.90 | 0.60 | 0.90 | 0.90 | 0.90 |
| Fe2O3 | 0.23 | 0.23 | 0.23 | 0.23 | 0.25 | 0.25 | 0.25 | 0.23 | 0.23 | 0.23 |
| SiO2/RO | 2.24 | 2.23 | 2.24 | 2.25 | 2.25 | 2.26 | 2.26 | 2.20 | 2.17 | 2.20 |
| $T_{FORM}$ (° C.) | 1202 | 1203 | 1201 | 1208 | 1197 | 1200 | 1216 | 1202 | 1194 | 1192 |
| $T_{LIQ}$ (° C.) | 1141 | 1145 | 1138 | 1137 | 1130 | 1134 | 1160 | 1137 | 1142 | 1137 |
| ΔT (° C.) | 61 | 58 | 63 | 71 | 67 | 66 | 56 | 65 | 52 | 55 |

| Composition | Examples | | | | | | | | | |
|---|---|---|---|---|---|---|---|---|---|---|
| Weight % | 228 | 229 | 230 | 231 | 232 | 233 | 234 | 235 | 236 | 237 |
| SiO2 | 58.61 | 58.61 | 58.00 | 57.90 | 58.11 | 58.40 | 58.40 | 58.50 | 58.60 | 58.00 |
| Al2O3 | 12.16 | 12.16 | 13.23 | 13.23 | 13.36 | 13.36 | 13.03 | 13.03 | 13.03 | 13.63 |
| CaO | 23.50 | 23.50 | 23.64 | 23.74 | 23.40 | 23.11 | 23.44 | 23.34 | 23.24 | 23.24 |
| MgO | 2.50 | 2.50 | 2.50 | 2.50 | 2.50 | 2.50 | 2.50 | 2.50 | 2.50 | 2.50 |
| TiO2 | 1.10 | 1.10 | 0.50 | 0.50 | 0.50 | 0.50 | 0.50 | 0.50 | 0.50 | 0.50 |
| B2O3 | 1.00 | 1.00 | 1.00 | 1.00 | 1.00 | 1.00 | 1.00 | 1.00 | 1.00 | 1.00 |
| Na2O | | 0.45 | | | | | | | | |
| K2O | | | | | | | | | | |
| Li2O | 0.90 | 0.45 | 0.90 | 0.90 | 0.90 | 0.90 | 0.90 | 0.90 | 0.90 | 0.90 |
| Fe2O3 | 0.23 | 0.23 | 0.23 | 0.23 | 0.23 | 0.23 | 0.23 | 0.23 | 0.23 | 0.23 |
| SiO2/RO | 2.25 | 2.25 | 2.22 | 2.21 | 2.24 | 2.28 | 2.25 | 2.26 | 2.28 | 2.25 |
| $T_{FORM}$ (° C.) | 1201 | 1227 | 1201 | 1195 | 1196 | 1204 | 1201 | 1204 | 1204 | 1206 |
| $T_{LIQ}$ (° C.) | 1142 | 1159 | 1135 | 1137 | 1133 | 1133 | 1136 | 1133 | 1135 | 1136 |
| ΔT (° C.) | 59 | 68 | 66 | 58 | 63 | 71 | 65 | 71 | 69 | 70 |

| Composition | Examples | | | | | | | | | |
|---|---|---|---|---|---|---|---|---|---|---|
| Weight % | 238 | 239 | 240 | 241 | 242 | 243 | 244 | 245 | 246 | 247 |
| SiO2 | 58.10 | 58.10 | 58.70 | 58.70 | 58.70 | 58.61 | 58.40 | 58.80 | 58.30 | 57.60 |
| Al2O3 | 13.23 | 13.43 | 12.75 | 12.35 | 12.35 | 12.16 | 12.76 | 12.46 | 13.03 | 13.03 |
| CaO | 23.54 | 23.34 | 23.50 | 23.50 | 23.50 | 23.50 | 23.71 | 23.61 | 23.54 | 24.04 |
| MgO | 2.50 | 2.50 | 2.50 | 2.50 | 2.50 | 2.50 | 2.50 | 2.50 | 2.50 | 2.50 |
| TiO2 | 0.50 | 0.50 | 0.50 | 0.50 | 0.50 | 1.10 | 0.50 | 0.50 | 0.50 | 0.50 |
| B2O3 | 1.00 | 1.00 | 0.60 | 1.00 | 1.00 | 1.00 | 1.00 | 1.00 | 1.00 | 1.20 |
| Na2O | | | 0.30 | 0.60 | 0.30 | | | | 0.10 | |
| K2O | | | | | | | | | | |
| Li2O | 0.90 | 0.90 | 0.90 | 0.60 | 0.90 | 0.90 | 0.90 | 0.90 | 0.90 | 0.80 |
| Fe2O3 | 0.23 | 0.23 | 0.25 | 0.25 | 0.25 | 0.23 | 0.23 | 0.23 | 0.23 | 0.23 |
| SiO2/RO | 2.23 | 2.25 | 2.26 | 2.26 | 2.26 | 2.23 | 2.25 | 2.26 | 2.24 | 2.17 |
| $T_{FORM}$ (° C.) | 1199 | 1204 | 1204 | 1207 | 1202 | 1194 | 1194 | 1195 | 1195 | 1196 |
| $T_{LIQ}$ (° C.) | 1133 | 1134 | 1153 | 1157 | 1149 | 1141 | 1144 | 1145 | 1140 | 1145 |
| ΔT (° C.) | 63 | 70 | 51 | 50 | 53 | 53 | 50 | 50 | 55 | 51 |

| Composition | Examples | | | | | | | | | |
|---|---|---|---|---|---|---|---|---|---|---|
| Weight % | 248 | 249 | 250 | 251 | 252 | 253 | 254 | 255 | 256 | 257 |
| SiO2 | 58.50 | 58.11 | 58.91 | 58.11 | 58.30 | 58.20 | 58.10 | 58.70 | 58.70 | 58.11 |
| Al2O3 | 12.76 | 13.36 | 12.16 | 13.36 | 13.03 | 13.03 | 13.03 | 13.35 | 13.35 | 13.36 |
| CaO | 23.61 | 23.40 | 23.80 | 23.40 | 23.54 | 23.64 | 23.74 | 23.50 | 23.50 | 23.40 |
| MgO | 2.50 | 2.50 | 2.50 | 2.50 | 2.50 | 2.50 | 2.50 | 2.50 | 2.50 | 2.50 |
| TiO2 | 0.50 | 0.50 | 0.50 | 0.50 | 0.50 | 0.50 | 0.50 | 0.50 | 0.50 | 0.50 |

TABLE F-continued

| Composition Weight % | | | | | | | | | | |
|---|---|---|---|---|---|---|---|---|---|---|
| B2O3 | 1.00 | 1.00 | 1.00 | 1.00 | 1.00 | 1.00 | 1.00 | 0.30 | 0.60 | 1.00 |
| Na2O | | | | | | | | | | |
| K2O | | | | | | | | | | |
| Li2O | 0.90 | 0.90 | 0.90 | 0.90 | 0.90 | 0.90 | 0.90 | 0.90 | 0.60 | 0.90 |
| Fe2O3 | 0.23 | 0.23 | 0.23 | 0.23 | 0.23 | 0.23 | 0.23 | 0.25 | 0.25 | 0.23 |
| SiO2/RO | 2.24 | 2.24 | 2.24 | 2.24 | 2.24 | 2.23 | 2.21 | 2.26 | 2.26 | 2.24 |
| T$_{FORM}$ (° C.) | 1197 | 1229 | 1216 | 1213 | 1202 | 1202 | 1205 | 1207 | 1224 | 1212 |
| T$_{LIQ}$ (° C.) | 1139 | 1155 | 1148 | 1142 | 1136 | 1136 | 1137 | 1144 | 1145 | 1135 |
| ΔT (° C.) | 58 | 133 | 123 | 126 | 120 | 119 | 122 | 114 | 142 | 139 |

| Composition Weight % | Examples | | | | | | | | | |
|---|---|---|---|---|---|---|---|---|---|---|
| | 258 | 259 | 260 | 261 | 262 | 263 | 264 | 265 | 266 | 267 |
| SiO2 | 58.20 | 58.70 | 59.53 | 59.61 | 59.11 | 59.11 | 59.16 | 59.21 | 57.80 | 59.11 |
| Al2O3 | 13.23 | 12.35 | 12.25 | 12.16 | 12.16 | 12.16 | 12.16 | 12.16 | 13.03 | 12.16 |
| CaO | 23.44 | 23.50 | 23.17 | 23.50 | 23.00 | 23.00 | 23.20 | 23.40 | 24.04 | 23.50 |
| MgO | 2.50 | 2.50 | 2.52 | 2.50 | 2.50 | 2.50 | 2.25 | 2.00 | 2.50 | 2.00 |
| TiO2 | 0.50 | 0.50 | 0.50 | 1.10 | 1.10 | 1.10 | 1.10 | 1.10 | 0.50 | 1.10 |
| B2O3 | 1.00 | 1.00 | 1.00 | 0.45 | 1.00 | 1.00 | 1.00 | 1.00 | 1.00 | 1.00 |
| Na2O | | | | | | | | | | |
| K2O | | | | | | | | | | |
| Li2O | 0.90 | 1.20 | 0.80 | 0.45 | 0.90 | 0.90 | 0.90 | 0.90 | 0.90 | 0.90 |
| Fe2O3 | 0.23 | 0.25 | 0.23 | 0.23 | 0.23 | 0.23 | 0.23 | 0.23 | 0.23 | 0.23 |
| SiO2/RO | 2.24 | 2.26 | 2.32 | 2.29 | 2.32 | 2.32 | 2.32 | 2.33 | 2.18 | 2.32 |
| T$_{FORM}$ (° C.) | 1204 | 1187 | 1214 | 1230 | 1205 | 1216 | 1218 | 1213 | 1196 | 1209 |
| T$_{LIQ}$ (° C.) | 1135 | 1147 | 1143 | 1155 | 1142 | 1143 | 1147 | 1153 | 1147 | 1153 |
| ΔT (° C.) | 124 | 40 | 71 | 75 | 63 | 73 | 71 | 60 | 49 | 56 |

| Composition Weight % | Examples | | | | | | | | | |
|---|---|---|---|---|---|---|---|---|---|---|
| | 268 | 269 | 270 | 271 | 272 | 273 | 274 | 275 | 276 | 277 |
| SiO2 | 59.36 | 59.31 | 59.36 | 59.41 | 59.11 | 59.16 | 59.21 | 59.16 | 59.11 | 59.01 |
| Al2O3 | 12.41 | 12.56 | 12.51 | 12.46 | 12.16 | 12.16 | 12.16 | 12.26 | 12.26 | 12.36 |
| CaO | 23.60 | 23.50 | 23.50 | 23.50 | 23.00 | 23.20 | 23.40 | 23.45 | 23.50 | 23.50 |
| MgO | 2.00 | 2.00 | 2.00 | 2.00 | 2.50 | 2.25 | 2.00 | 2.50 | 2.50 | 2.50 |
| TiO2 | 0.50 | 0.50 | 0.50 | 0.50 | 1.10 | 1.10 | 1.10 | 0.50 | 0.50 | 0.50 |
| B2O3 | 1.00 | 1.00 | 1.00 | 1.00 | 1.00 | 1.00 | 1.00 | 1.00 | 1.00 | 1.00 |
| Na2O | | | | | | | | | | |
| K2O | | | | | | | | | | |
| Li2O | 0.90 | 0.90 | 0.90 | 0.90 | 0.90 | 0.90 | 0.90 | 0.90 | 0.90 | 0.90 |
| Fe2O3 | 0.23 | 0.23 | 0.23 | 0.23 | 0.23 | 0.23 | 0.23 | 0.23 | 0.23 | 0.23 |
| SiO2/RO | 2.32 | 2.33 | 2.33 | 2.33 | 2.32 | 2.32 | 2.33 | 2.28 | 2.27 | 2.27 |
| T$_{FORM}$ (° C.) | 1216 | 1220 | 1220 | 1220 | 1216 | 1214 | 1220 | 1209 | 1210 | 1210 |
| T$_{LIQ}$ (° C.) | 1153 | 1153 | 1158 | 1155 | 1144 | 1147 | 1158 | 1150 | 1152 | 1152 |
| ΔT (° C.) | 63 | 67 | 62 | 65 | 72 | 67 | 62 | 59 | 58 | 58 |

| Composition Weight % | Examples | | | | | | | | | |
|---|---|---|---|---|---|---|---|---|---|---|
| | 278 | 279 | 280 | 281 | 282 | 283 | 284 | 285 | 286 | 287 |
| SiO2 | 58.91 | 58.91 | 59.21 | 58.31 | 58.61 | 58.70 | 58.60 | 58.50 | 58.75 | 58.75 |
| Al2O3 | 12.36 | 12.16 | 12.16 | 12.16 | 12.76 | 12.46 | 12.46 | 12.46 | 12.93 | 12.93 |
| CaO | 23.60 | 23.80 | 23.50 | 24.40 | 23.50 | 23.71 | 23.81 | 23.91 | 22.93 | 22.93 |
| MgO | 2.50 | 2.50 | 2.50 | 2.50 | 2.50 | 2.50 | 2.50 | 2.50 | 2.36 | 2.36 |
| TiO2 | 0.50 | 0.50 | 0.50 | 0.50 | 0.50 | 0.50 | 0.50 | 0.50 | 0.50 | 0.50 |
| B2O3 | 1.00 | 1.00 | 1.00 | 1.00 | 1.00 | 1.00 | 1.00 | 1.00 | 1.20 | 1.20 |
| Na2O | | | | | | | | | 0.14 | 0.24 |
| K2O | | | | | | | | | 0.10 | 0.10 |
| Li2O | 0.90 | 0.90 | 0.90 | 0.90 | 0.90 | 0.90 | 0.90 | 0.90 | 0.80 | 0.70 |
| Fe2O3 | 0.23 | 0.23 | 0.23 | 0.23 | 0.23 | 0.23 | 0.23 | 0.23 | 0.29 | 0.29 |
| SiO2/RO | 2.26 | 2.28 | 2.28 | 2.17 | 2.25 | 2.24 | 2.23 | 2.22 | 2.32 | 2.32 |
| T$_{FORM}$ (° C.) | 1196 | 1196 | 1201 | 1195 | 1183 | 1193 | 1192 | 1191 | 1211 | 1218 |
| T$_{LIQ}$ (° C.) | 1152 | 1156 | 1143 | 1151 | 1165 | 1152 | 1151 | 1152 | 1127 | 1129 |
| ΔT (° C.) | 44 | 40 | 58 | 44 | 18 | 41 | 41 | 39 | 84 | 89 |

| Composition Weight % | Examples | | | | | | | | | | |
|---|---|---|---|---|---|---|---|---|---|---|---|
| | 288 | 289 | 290 | 291 | 292 | 293 | 294 | 295 | 296 | 297 | 298 |
| SiO2 | 58.50 | 58.70 | 58.70 | 58.10 | 58.70 | 58.91 | 59.11 | 59.31 | 59.21 | 60.12 | 59.11 |
| Al2O3 | 12.34 | 13.05 | 12.75 | 13.63 | 13.35 | 12.16 | 12.16 | 12.26 | 12.26 | 13.00 | 12.16 |
| CaO | 23.70 | 23.50 | 23.50 | 23.14 | 23.50 | 23.80 | 23.50 | 22.30 | 23.40 | 21.13 | 23.00 |
| MgO | 2.50 | 2.50 | 2.50 | 2.50 | 2.50 | 2.50 | 2.00 | 2.50 | 2.50 | 2.50 | 2.50 |
| TiO2 | 0.50 | 0.50 | 0.50 | 0.50 | 0.50 | 0.50 | 1.10 | 0.50 | 0.50 | 1.10 | 1.10 |
| B2O3 | 1.20 | 0.30 | 0.60 | 1.00 | 0.90 | 1.00 | 1.00 | 1.00 | 1.00 | 1.00 | 1.00 |
| Na2O | | | | | | | | | | | 0.45 |
| K2O | 0.08 | | | | | | | | | | |

TABLE F-continued

| | | | | | | | | | | | |
|---|---|---|---|---|---|---|---|---|---|---|---|
| LiO2 | 0.90 | .20 | 1.20 | 0.90 | 0.30 | 0.90 | 0.90 | 0.90 | 0.90 | 0.90 | 0.45 |
| Fe2O3 | 0.28 | 0.25 | 0.25 | 0.23 | 0.25 | 0.23 | 0.23 | 0.23 | 0.23 | 0.25 | 0.23 |
| SiO2/RO | 2.23 | 2.26 | 2.26 | 2.27 | 2.26 | 2.24 | 2.32 | 2.39 | 2.29 | 2.54 | 2.32 |
| $T_{FORM}$ (° C.) | 1195 | 1196 | 1195 | 1204 | 1239 | 1197 | 1215 | 1209 | 1210 | 1285 | 1243 |
| $T_{LIQ}$ (° C.) | 1151 | 1147 | 1147 | 1115 | 1143 | 1155 | 1155 | 1148 | 1156 | 1189 | 1149 |
| $\Delta T$ (° C.) | 44 | 49 | 48 | 89 | 96 | 42 | 60 | 61 | 54 | 96 | 94 |

\* compositions include 0.05 wt % SrO and 0.08 wt % SO3

The samples were experimental samples produced in a laboratory. The experimental samples were prepared from reagent grade oxides (e.g., pure silica or calcia). The batch size for each example was 1000 grams. The individual batch ingredients were weighed out, combined and placed in a tightly sealed glass jar or plastic container. The sealed jar or container was then placed in a paint shaker for 15 minutes or in a turbular mixer for 25 minutes to effectively mix the ingredients. A portion of the batch was then place into a platinum crucible, filling no more than ¾ of its volume. The crucible was then placed in a furnace and heated to 1427° C. (2600° F.) for 15 minutes. The remaining batch was then added to the hot crucible and heated to 1427° C. (2600° F.) for 15 to 30 minutes. The furnace temperature was then raised to 1482° C. (2700° F.) and held there for 2 hours. The molten glass was then fritted in water and dried. The fritted samples were remelted at 1482° C. (2700° F.) and held there for 2 hours. The molten glass was then fritted again in water and dried. The forming temperature, i.e. the glass temperature at a viscosity of 1000 poise, was determined by ASTM method C965–81, and the liquidus temperature by ASTM method C829–81.

The weight percent of the constituents of the compositions shown in Tables A through F are based on the weight percent of each constituent in the batch. It is believed that the batch weight percent is generally about the same as the weight percent of the melted sample, except for glass batch materials that volatilize during melting, e.g. boron and fluorine. For boron, it is believed that the weight percent of $B_2O_3$ in a laboratory sample will be 5 to 15 percent less than the weight percent of $B_2O_3$ in the batch composition, the precise loss depending on the composition and melting conditions. For fluorine, It is believed that the weight percent of fluorine in a laboratory test sample will be about 50 percent less than the weight percent of fluorine in the batch composition, the precise loss depending on the composition and melting conditions. It is further believed that glass fiber compositions made from commercial grade materials and melted under conventional operating conditions will have similar batch and melt weight percents as discussed above, with the precise loss depending, in part, on the furnace operating temperature, through-put and quality of commercial batch materials. The amount of born and fluorine reported in the tables takes into consideration the expected loss of these materials and represents the expected amount of the material in the glass composition.

Determination of the log 3 forming temperature was based on the glass samples being compared against physical standards supplied by the National Institute of Standards and Testing (NIST). In Tables A through F, the reported log 3 forming temperature is based on comparison to either NIST 710A or NIST 714, both of which are a soda lime silica glass standard. It is expected that both standards will provide comparable results since both are based on a soda lime silica standard. The $T_{LIQ}$ is unaffected by the NIST standard. Unless otherwise stated, the log 3 forming temperatures reported herein are based on the NIST 714 standard.

In the present invention, the compositional variables of interest are the weight percent $SiO_2$ and weight percent RO, and the relationship of interest is the ratio of $SiO_2$ to RO, i.e. $SiO_2/RO$. The melt properties of interest are the forming temperature and the liquidus temperature since one goal in the present invention is to provide a low boron glass composition having a lowered forming temperature and a desired $\Delta T$ so that the composition can be processed at a lowered temperature while reducing the possibility of devitrification of the molten glass in the bushing area during a glass fiber forming operation. Without limiting the present invention, in one nonlimiting embodiment, the glass composition has a $\Delta T$ of at least 50° C. (90° F.), e.g. at least 55° C. (100° F.). In other nonlimiting embodiments, the glass composition has a $\Delta T$ of 50 to 100° C. (90 to 180° F.), or 50 to 83° C. (90 to 150° F.), or 50 to 72° C. (90 to 130° F.).

Referring to FIGS. 1 through 6, the relationship between the $SiO_2/RO$ ratio is plotted against both the forming temperature and liquidus temperature of the sample. The most suitable trendlines for the temperatures are based on a second order regression analysis protocol, and in particular are 2nd order polynomial curves generated using Microsoft® Excel 97 SR-2(f). By inference, both trendlines also show the resulting change of the $\Delta T$ between liquidus and forming temperatures.

In viewing FIGS. 1 through 6, it can be seen that as the $SiO_2/RO$ ratio decreases, the forming temperature generally decreases, while the trend in the liquidus temperature differs depending on the glass type. In addition, it can be seen that as the $SiO_2/RO$ ratio decreases, $\Delta T$ also decreases. As a result, the $SiO_2/RO$ ratio can be used to reduce the forming temperature of a glass fiber forming composition while providing a desired $\Delta T$. More particularly, in the present invention where $\Delta T$ is at least 50° C., a composition having a $\Delta T$ of 50° C. is indicative of a composition having a combination of materials and amounts that provides a minimum permissible forming temperature, i.e. the lowest forming temperature for the particular combination of constituents that still maintains the desired range between the forming and liquidus temperatures. From this, it can be inferred that the narrower the $\Delta T$ range, the closer the glass forming temperature is to having the minimum permissible forming temperature for that particular combination of constituents. It can also be inferred that the further the $\Delta T$ of a glass composition is from the minimum permissible $\Delta T$, the greater the opportunity to modify the glass composition in a manner that reduces $T_{FORM}$ while maintaining a $\Delta T$ no less than the minimum permissible $\Delta T$. To this end, the $SiO_2/RO$ ratio can be manipulated by changing the amount of $SiO_2$ and/or RO to produce a glass composition having a $\Delta T$ as close as possible to the minimum desired $\Delta T$. It should be appreciated that if the $SiO_2/RO$ ratio drops too low, $\Delta T$ can drop to an unacceptable level. Although not required, in one nonlimiting embodiment of the present invention, $SiO_2/RO$ is no greater that 2.35. In other nonlimiting embodiments, $SiO_2/RO$ is no greater than 2.30, or no greater than 2.25, or no greater than 2.20. In still another nonlimiting embodiment of the invention, $SiO_2/RO$ ranges from 1.9 to 2.3, e.g. 2.05 to 2.29.

Although Tables A through F and corresponding FIGS. 1 through 6 illustrate how the ratio of the weight percent of $SiO_2$ to RO effects the melt properties of the glass, and in particular the liquidus temperature, forming temperature and ΔT, additional glass sample compositions as well as additional relationships between the glass constituents, such as for example the difference in the amount of $SiO_2$ and RO (i.e. $SiO_2$ wt %-RO wt %), the weight percent of $Al_2O_3$, the ratio of $SiO_2$ to $Al_2O_3$, and the ratio of RO to $Al_2O_3$, as they relate to liquidus and forming temperatures and ΔT, are disclosed in U.S. Provisional Application No. 60/230474, which is incorporated herein by reference.

It is known that pure silica is the highest melting glass former. A pure silica melt does not have a well defined melting point, but gradually solidifies and forms a glass as it cools to room temperature and its viscosity drops from greater than log 4 (10,000) poise at 2500° C. (1371° F.). Pure calcia, magnesia and alumina melts are known to have very low viscosities of 0.5–2 poise at their respective melting points. These materials do not solidify into a glass but rather crystallize instantly at their sharply defined melting point. In a typical quaternary $SiO_2$—$Al_2O_3$—CaO—MgO glass composition with 60% $SiO_2$ and 21% CaO, each oxide contributes its unique characteristics toward its balance of melt properties.

Based on these material properties, it can be inferred that as $SiO_2$, which is the largest oxide component of the glass composition in terms of weight percent, is reduced in a given composition of this type, the melt viscosity and the resulting level is kept low, i.e. no greater than 59 wt % $SiO_2$, in order to promote a lower log 3 forming temperature. In other nonlimiting embodiments of the present invention, the glass compositions have no greater than 58 wt % $SiO_2$, or no greater than 57 wt % $SiO_2$.

Table G summarizes features of selected low boron glass compositions disclosed in Tables A through F that have (i) a $T_{FORM}$ of no greater than 1240° C. (2264° F.), (ii) a ΔT in the range of 50–83° C. (90–150° F.) and (iii) no greater than 59 wt % $SiO_2$. It has been found that a forming temperature of greater than 1240° C. can accelerate the precious metal loss in the glass fiber forming bushings. In other nonlimiting embodiments of the present invention, the forming temperature is no greater than 1230° C., or no greater than 1220° C., or no greater than 1210° C., or no greater than 1200° C.

For comparison purposes, Table G also includes similar features of selected Type I-1 and I-2 glasses, two commercial boron containing E-glass compositions, and two commercial ADVANTEX glass compositions. It is noted that none of these specific examples meets the selection criteria for the glasses of the present invention presented in Table G.

TABLE G

| Composition | % $SiO_2$ | $SiO_2$/RO | $T_{FORM}$ (° C.) | $T_{LIQ}$ (° C.) | ΔT (° C.) |
|---|---|---|---|---|---|
| commercial glass 1[1] (5.1 wt % $B_2O_3$) | 55.2 | 2.31 | 1207 | 1069 | 138 |
| commercial glass 2[1] (6.1 wt % $B_2O_3$) | 53.1 | 2.32 | 1172 | 1077 | 95 |
| Type I-1 glass (no boron) | | | | | |
| from Patent '106 | 59 | 2.27 | 1249[2] | 1149 | 100 |
| from Patent '144 - Ex. 1 | 60.18 | 2.46 | 1255[2] | 1180 | 75 |
| from Patent '329 | 59.05–60.08 | 2.18–2.43 | 1248–1289[2] | 1169–1219 | 56–96 |
| commercial ADVANTEX glass sample 1[3] | 59.36 | 2.26 | 1268 | 1180 | 88 |
| commercial ADVANTEX glass sample 2[3] | 60.17 | 2.28 | 1266 | 1189 | 77 |
| Type I-2 glass | | | | | |
| from Patent '144 - Ex. 2 (1.8 wt % $B_2O_3$) | 60.82 | 2.53 | 1262[2] | 1180 | 82 |
| Selection criteria | ≦59 | | ≦1240 | | 50–83 |
| Type II-I (no boron) | 57.45–58.05 | 2.13–2.21 | 1232–1240 | 1164–1167 | 66–74 |
| Type II-2 (w/$B_2O_3$) | 55.4–58.55 | 2.03–2.28 | 1202–1240 | 1127–1178 | 55–83 |
| Type III-1 (no boron) | 57.65–58.96 | 2.16–2.26 | 1205–1237 | 1146–1172 | 52–69 |
| Type III-2 (no boron) | 57.35–58.30 | 2.18–2.29 | 1195–1213 | 1136–1157 | 54–71 |
| Type III-3 (no boron) | 58.19–59.00 | 2.24–2.28 | 1212–1234 | 1159–1181 | 50–69 |
| Type III-4 (w/$B_2O_3$) | 57.60–58.80 | 2.17–2.32 | 1192–1227 | 1125–1160 | 50–83 |

[1]produced by PPG Industries, Inc., Pittsburgh, PA.
[2]glass standard unknown
[3]sample analyzed using X-ray fluorescence analysis log 3 forming temperature drops. If CaO, which is the second largest component of the glass composition in terms of weight percent, is increased in such a composition, the effect of RO (CaO+MgO) on the glass properties will be twofold. More specifically, it will not only increase the fluidity of the resulting melt (i.e. decrease its viscosity) but it will also increase the crystallizability of the resulting melt (i.e. increase its liquidus temperature), and therefore reduce the ΔT.

As a result, although not required, in one nonlimiting embodiment of the present invention, the glass compositions have (1) the lowest $SiO_2$ content that will yield the lowest log 3 forming temperatures, in combination with (2) the ratio of $SiO_2$ to RO (RO=CaO+MgO) that yields the process-required ΔT, which in the present invention is at least 50° C.

Based on the above and although not required, in one nonlimiting embodiment of the present invention, the silica, Referring to Table G, it can be seen that the selected boron-free Type II-1, III-1, III-2 and III-3 glasses generally have less $SiO_2$, a lower $SiO_2$/RO ratio, a lower forming temperature, and a narrower ΔT range than the sample boron-free Type I-1 glasses. Similarly, the selected boron-containing Type II-2 and III-4 glasses generally have less $SiO_2$, a lower $SiO_2$/RO ratio, a lower forming temperature, and a narrower ΔT range than the sample boron-containing Type I-2 glasses. Furthermore, the selected Type II and III glasses generally have a higher $SiO_2$ content, a lower $SiO_2$/RO ratio, and a narrower ΔT range than the two commercial, high boron content samples.

Tables H, I, J and K illustrate additional glass compositions according to the present invention.

TABLE H

| Composition Weight % | Examples | | | | | | | | | | |
|---|---|---|---|---|---|---|---|---|---|---|---|
| | 299 | 300 | 301 | 302 | 303 | 304 | 305 | 306 | 307 | 308 | 309 |
| SiO2 | 56.25 | 56.45 | 56.75 | 56.50 | 56.75 | 57.5 | 56.75 | 57.75 | 57.75 | 57.75 | 55.40 |
| Al2O3 | 13.2 | 13.20 | 13.20 | 13.20 | 13.20 | 12.2 | 13.2 | 12.2 | 12.2 | 12.2 | 13.6 |
| CaO | 24.25 | 24.25 | 23.95 | 24.00 | 23.75 | 24 | 23.95 | 23.75 | 23.75 | 23.95 | 24.5 |
| MgO | 2.55 | 2.55 | 2.55 | 2.55 | 2.55 | 2.55 | 2.55 | 2.55 | 2.55 | 2.55 | 2.95 |
| TiO2 | 1.10 | 1.10 | 1.10 | 1.10 | 1.10 | 1.10 | 1.10 | 1.10 | 1.10 | 1.10 | 1.10 |
| Na2O | 0.9 | 0.90 | 0.90 | 0.90 | 0.90 | 0.90 | 0.90 | 0.90 | 0.90 | 0.90 | 0.45 |
| K2O | | | | | | | | | | | 0.45 |
| Fe2O3 | 0.25 | 0.25 | 0.25 | 0.25 | 0.25 | 0.25 | 0.25 | 0.25 | 0.25 | 0.25 | 0.25 |
| B2O3 | 1.30 | 1.30 | 1.30 | 1.30 | 1.40 | 1.30 | 1.20 | 1.40 | 1.30 | 1.40 | 1.30 |
| SiO2/RO | 2.10 | 2.11 | 2.14 | 2.13 | 2.16 | 2.17 | 2.14 | 2.20 | 2.20 | 2.18 | 2.02 |
| $T_{FORM}$ (° C.) | 1210 | 1214 | 1215 | 1215 | 1215 | 1216 | 1216 | 1217 | 1217 | 1218 | 1210 |
| $T_{LIQ}$ (° C.) | 1154 | 1159 | 1154 | 1154 | 1160 | 1152 | 1147 | 1151 | 1147 | 1155 | 1157 |
| ΔT (° C.) | 56 | 55 | 61 | 61 | 55 | 64 | 69 | 66 | 70 | 63 | 53 |

| Composition Weight % | Examples | | | | | | | | | | |
|---|---|---|---|---|---|---|---|---|---|---|---|
| | 310 | 311 | 312 | 313 | 314 | 315 | 316 | 317 | 318 | 319 | 320 |
| SiO2 | 55.40 | 56.05 | 55.85 | 56.00 | 56.60 | 56.50 | 56.10 | 56.50 | 55.95 | 56.50 | 56.45 |
| Al2O3 | 13.60 | 13.10 | 13.38 | 13.37 | 13.25 | 13.45 | 13.38 | 13.45 | 13.95 | 13.49 | 13.48 |
| CaO | 24.50 | 24.55 | 24.67 | 24.53 | 24.60 | 24.50 | 24.42 | 24.50 | 24.55 | 24.46 | 24.52 |
| MgO | 2.95 | 2.75 | 2.55 | 2.55 | 2.55 | 2.55 | 2.55 | 2.55 | 2.55 | 2.55 | 2.55 |
| TiO2 | 1.10 | 1.10 | 1.10 | 1.10 | 0.55 | 0.55 | 0.55 | 0.55 | 0.55 | 0.55 | 0.55 |
| Na2O | 0.45 | 0.45 | 0.45 | 0.45 | 0.90 | 0.90 | 0.90 | 0.90 | 0.90 | 0.90 | 0.90 |
| K2O | 0.45 | 0.45 | 0.45 | 0.45 | | | | | | | |
| Fe2O3 | 0.25 | 0.25 | 0.25 | 0.25 | 0.25 | 0.25 | 0.25 | 0.25 | 0.25 | 0.25 | 0.25 |
| B2O3 | 1.30 | 1.30 | 1.30 | 1.30 | 1.30 | 1.30 | 1.30 | 1.30 | 1.30 | 1.30 | 1.30 |
| SiO2/RO | 2.02 | 2.05 | 2.05 | 2.07 | 2.09 | 2.09 | 2.08 | 2.09 | 2.07 | 2.09 | 2.09 |
| $T_{FORM}$ (° C.) | 1211 | 1218 | 1220 | 1221 | 1211 | 1212 | 1215 | 1216 | 1218 | 1219 | |
| $T_{LIQ}$ (° C.) | 1151 | 1156 | 1148 | 1157 | 1153 | 1158 | 1150 | 1157 | 1162 | 1161 | 1158 |
| ΔT (° C.) | 60 | 62 | 72 | 64 | 58 | 54 | 65 | 58 | 54 | 57 | 61 |

TABLE I

| Composition Weight % | Examples | | | | | | | | | | | |
|---|---|---|---|---|---|---|---|---|---|---|---|---|
| | 312 | 322 | 323 | 324 | 325 | 326 | 327 | 328 | 329 | 330 | 331 | 332 |
| SiO2 | 55.50 | 55.25 | 55.00 | 55.75 | 55.50 | 55.25 | 54.20 | 54.50 | 54.12 | 55.00 | 54.50 | 54.70 |
| Al2O3 | 13.20 | 13.20 | 13.20 | 13.30 | 13.30 | 13.30 | 13.35 | 13.25 | 13.30 | 13.25 | 13.25 | 13.20 |
| CaO | 23.50 | 23.75 | 24.00 | 23.70 | 23.95 | 24.20 | 24.55 | 24.55 | 24.55 | 24.25 | 24.55 | 24.50 |
| MgO | 2.55 | 2.55 | 2.55 | 2.55 | 2.55 | 2.55 | 2.55 | 2.55 | 3.00 | 2.55 | 2.67 | 2.55 |
| TiO2 | 1.10 | 1.10 | 1.10 | 0.55 | 0.55 | 0.55 | 0.55 | 0.55 | 0.55 | 0.55 | 0.55 | 0.55 |
| Na2O | 0.90 | 0.90 | 0.90 | 0.90 | 0.90 | 0.90 | 0.45 | 0.45 | 0.45 | 0.45 | 0.45 | 0.45 |
| K2O | | | | | | | 0.55 | 0.55 | 0.55 | 0.55 | 0.55 | 0.55 |
| B2O3 | 3.00 | 3.00 | 3.00 | 3.00 | 3.00 | 3.00 | 3.00 | 3.00 | 3.00 | 3.00 | 3.00 | 3.00 |
| Fe2O3 | 0.250 | 0.250 | 0.250 | 0.250 | 0.250 | 0.250 | 0.28 | 0.28 | 0.28 | 0.28 | 0.28 | 0.28 |
| F | | | | | | | 0.20 | 0.20 | 0.10 | 0.10 | 0.10 | 0.10 |
| SrO | | | | | | | 0.12 | 0.12 | 0.10 | 0.12 | 0.10 | 0.12 |
| SiO2/RO | 2.13 | 2.10 | 2.07 | 2.12 | 2.09 | 2.07 | 1.99 | 2.01 | 1.96 | 2.05 | 2.00 | 2.02 |
| $T_{FORM}$ (° C.) | 1193 | 1198 | 1201 | 1201 | 1200 | 1198 | 1190 | 1194 | 1196 | 1197 | 1201 | 1201 |
| $T_{LIQ}$ (° C.) | 1129 | 1122 | 1127 | 1127 | 1129 | 1128 | 1120 | 1124 | 1132 | 1124 | 1131 | 1119 |
| ΔT (° C.) | 64 | 76 | 74 | 74 | 71 | 70 | 70 | 70 | 64 | 73 | 70 | 82 |

TABLE J

| Composition Weight % | Examples | | | |
|---|---|---|---|---|
| | 333 | 334 | 335 | 336 |
| SiO2 | 53.05 | 53.50 | 53.00 | 53.00 |
| Al2O3 | 14.01 | 14.00 | 13.50 | 13.10 |
| CaO | 24.28 | 24.00 | 24.00 | 24.00 |
| MgO | 1.00 | 1.50 | 2.50 | 2.90 |
| TiO2 | 0.52 | 0.50 | 0.50 | 0.50 |
| Na2O | 0.53 | 0.90 | 0.90 | 0.90 |
| Fe2O3 | 0.91 | 0.10 | 0.10 | 0.10 |
| B2O3 | 5.10 | 4.94 | 4.93 | 5.02 |
| K2O | 0.10 | 0.37 | 0.37 | 0.37 |
| F | 0.52 | 0.50 | 0.50 | 0.50 |
| SrO | 0.13 | 0.13 | 0.13 | 0.13 |
| Cr2O3 | | 0.13 | 0.13 | 0.13 |
| SiO2/RO | 2.01 | 2.10 | 2.00 | 1.97 |
| $T_{FORM}$ (° C.) | 1171 | 1177 | 1172 | 1167 |
| $T_{LIQ}$ (° C.) | 1114 | 1122 | 1103 | 1110 |
| ΔT (° C.) | 57 | 57 | 69 | 57 |

TABLE K

| Composition | Examples | | |
|---|---|---|---|
| Weight % | 337 | 338 | 339 |
| SiO2 | 54.60 | 56.75 | 57.85 |
| Al2O3 | 13.35 | 13.20 | 12.45 |
| CaO | 24.55 | 23.95 | 24.05 |
| MgO | 2.55 | 2.55 | 2.55 |
| TiO2 | 0.35 | 1.10 | 0.55 |
| Na2O | 0.15 | 0.60 | 0.60 |
| Fe2O3 | 0.28 | 0.25 | 0.35 |
| B2O3 | 3.00 | 1.40 | 1.30 |
| K2O | 0.55 | | |
| F | 0.20 | | |
| SrO | 0.12 | | |
| Li2O | 0.30 | 0.30 | 0.30 |
| SiO2/RO | 2.19 | 2.27 | 2.35 |
| $T_{FORM}$ (° C.) | 1187 | 1206 | 1208 |
| $T_{LIQ}$ (° C.) | 1133 | 1152 | 1154 |
| $\Delta T$ (° C.) | 54 | 54 | 54 |

More particularly, the compositions in Table H are Type II-2 glass compositions, i.e. low boron content glasses having 1.2 to 1.4 wt % $B_2O_3$, which have a low $SiO_2$ content ranging from 55.4 to 57.75 wt %, a $SiO_2$/RO ratio ranging from 2.02 to 2.20, a forming temperature ranging from 1210 to 1221° C. and a $\Delta T$ ranging from 54 to 72° C. Table I compositions are also low boron Type II-2 compositions the include 3 wt % $B_2O_3$. These compositions have a low $SiO_2$ content ranging from 54.12 to 55.75 wt %, a $SiO_2$/RO ratio ranging from 1.96 to 2.13, a forming temperature ranging from 1193 to 1201° C. and a $\Delta T$ ranging from 64 to 82° C. Table J includes additional Type II-2 compositions having a $B_2O_3$ of around 5 wt %. Of particular note for the compositions in Table J are the low $SiO_2$ contents (53.00 to 53.50 wt %), $SiO_2$/RO ratios (1.97 to 2.10), forming temperatures (1167 to 1177° C.), and $\Delta T$ range (57 to 69° C.). Table K includes Type III-4 compositions that have a low $SiO_2$ content ranging from 54.60 to 57.85 wt %, a $SiO_2$/RO ratio ranging from 2.19 to 2.35, a forming temperature ranging from 1187 to 1208° C. and a $\Delta T$ of 54° C.

Based on the above, in one nonlimiting embodiment of the present invention, the glass fiber composition comprises 52 to 62 percent by weight $SiO_2$, 0 to 2 percent by weight $Na_2O$, 16 to 25 percent by weight CaO, 8 to 16 percent by weight $Al_2O_3$, 0.05 to 0.80 percent by weight $Fe_2O_3$, 0 to 2 percent by weight $K_2O$, 1 to 5 percent by weight MgO, 0 to 5 percent by weight $B_2O_3$, 0 to 2 percent by weight $TiO_2$, and 0 to 1 percent by weight F, wherein the glass composition has a log 3 forming temperature of no greater than 1240° C. based on an NIST 714 reference standard, a $\Delta T$ of at least 50° C., and a $SiO_2$/RO ratio of no greater than 2.35. In another nonlimiting embodiment, the $SiO_2$ content of the glass composition is no greater than 59 percent by weight, $\Delta T$ is in the range from 50 to 83° C., and the $SiO_2$/RO ratio is in the range from 1.9 to 2.3, and further the log 3 forming temperature is no greater than 1230° C. based on an NIST 714 reference standard. In still another nonlimiting embodiment, the glass composition is boron-free.

In another nonlimiting embodiment of the present invention, the glass fiber composition comprises 53 to 59 percent by weight $SiO_2$, 0 to 2 percent by weight $Na_2O$, 16 to 25 percent by weight CaO, 8 to 16 percent by weight $Al_2O_3$, 0.05 to 0.80 percent by weight $Fe_2O_3$, 0 to 2 percent by weight $K_2O$, 1 to 4 percent by weight MgO, 0 to 5 percent by weight $B_2O_3$, 0 to 2 percent by weight $TiO_2$, and 0 to 1 percent by weight F, wherein the glass composition has a log 3 forming temperature of no greater than 1240° C. based on an NIST 714 reference standard, a $\Delta T$ in the range of 50 to 100° C., and a $SiO_2$/RO ratio in the range of 1.9 to 2.3.

In viewing the tables and figures, it should be appreciated that many of the sample compositions, although they have a $\Delta T$ greater than the minimum required $\Delta T$ for a particular process, they also have a higher forming temperature than that of the compositions of the present invention due, in part, to their high silica levels and/or high $SiO_2$/RO ratios. As a result, such compositions are more expensive to produce commercially, at least in terms of energy costs. Such compositions include the Type I compositions discussed herein. In addition, the tables and figures contain many samples containing a $\Delta T$ less than the minimum desired $\Delta T$ of 50° C. (90° F.). These types of compositions can be found across the compositional spectrum in each figure but especially at low silica and $SiO_2$/RO levels. Because of the narrower $\Delta T$ range, the risk of the molten glass solidifying in the bushing area during a glass fiber forming operation increases to an unacceptable level.

It will be appreciated by those skilled in the art that changes could be made to the embodiments described above without departing from the broad inventive concept thereof. It is understood, therefore, that this invention is not limited to the particular embodiments disclosed, but it is intended to cover modifications that are within the spirit and scope of the invention, as defined by the appended claims.

I claim:

1. A glass composition comprising:

| | |
|---|---|
| $SiO_2$ | 57 to 60.8 percent by weight; |
| $Al_2O_3$ | 12 to 13.6 percent by weight; |
| CaO | 22 to 25 percent by weight; |
| MgO | 1.7 to 3 percent by weight; |
| $TiO_2$ | 0.5 to 2 percent by weight; |
| $Li_2O$ | 0.6 to 1.5 percent by weight; |
| $Na_2O$ | 0 to 2 percent by weight; |
| $K_2O$ | 0 to 2 percent by weight; |
| $Fe_2O_3$ | up to 0.5 percent by weight; | wherein the glass composition is essentially boron-free, has a log 3 forming temperature no greater than 1230° C. based on NIST 710A reference standard, the difference between the log 3 forming temperature and the liquidus temperature is at least 50° C., and the ratio of $SiO_2$ to (CaO+MgO) is no greater than 2.42.

2. The glass composition according to claim 1, wherein the glass is essentially fluorine-free.

3. The glass composition according to claim 1, wherein the ratio of $SiO_2$ to (CaO+MgO) is no greater than 2.40.

4. The glass composition according to claim 1, wherein the ratio of $SiO_2$ to (CaO+MgO) is from 2.15 to 2.35.

5. The glass composition according to claim 1, wherein the glass composition has a log 3 forming temperature no greater than 1220 C. based on an NIST 714 reference standard.

6. The glass composition according to claim 2, wherein the difference between the log 3 forming temperature and the liquidus temperature is at least 60° C.

7. The glass composition according to claim 5, wherein the difference between the log 3 forming temperature and the liquidus temperature is at least 60° C.

8. A glass composition comprising:

| | |
|---|---|
| $SiO_2$ | 59 to 60.2 percent by weight; |
| $Al_2O_3$ | 12.2 to 13.2 percent by weight; |
| CaO | 23 to 25 percent by weight; |
| MgO | 2 to 2.5 percent by weight; |
| $TiO_2$ | 0.5 to 1.5 percent by weight; |
| $Li_2O$ | 0.8 to 1 percent by weight; |
| $Na_2O$ | 0 to 1 percent by weight; |
| $K_2O$ | 0 to 1 percent by weight; |
| $Fe_2O_3$ | up to 0.5 percent by weight; | wherein the glass composition is essentially boron-free, has a log 3 forming temperature no greater than 1230° C. based on NIST 710A reference standard, the difference between the log 3 forming temperature and the liquidus temperature is at least 50° C., and the ratio of $SiO_2$ to (CaO+MgO) is no greater than 2.42.

9. The glass composition according to claim 8, wherein the log 3 forming temperature is no greater than 1220° C.

10. The glass composition according to claim 8, wherein the difference between the log 3 forming temperature and the liquidus temperature is at least 60° C.

* * * * *

UNITED STATES PATENT AND TRADEMARK OFFICE
CERTIFICATE OF CORRECTION

PATENT NO.    : 6,818,575 B2
DATED         : November 16, 2004
INVENTOR(S)   : Wallenberger It is certified that error appears in the above-identified patent and that said Letters Patent is hereby corrected as shown below:

<u>Title page,</u>
Item [57], ABSTRACT,
Line 4, "K2" should read -- K2O --.

<u>Column 28,</u>
Line 59, "122020" should read -- 1220° --.

Signed and Sealed this

Twenty-fifth Day of October, 2005

JON W. DUDAS
*Director of the United States Patent and Trademark Office*